J. L. MORRIS & A. W. LARIMORE.
CASH REGISTER.
APPLICATION FILED SEPT. 28, 1915.
1,292,354.
Patented Jan. 21, 1919.
15 SHEETS—SHEET 1.
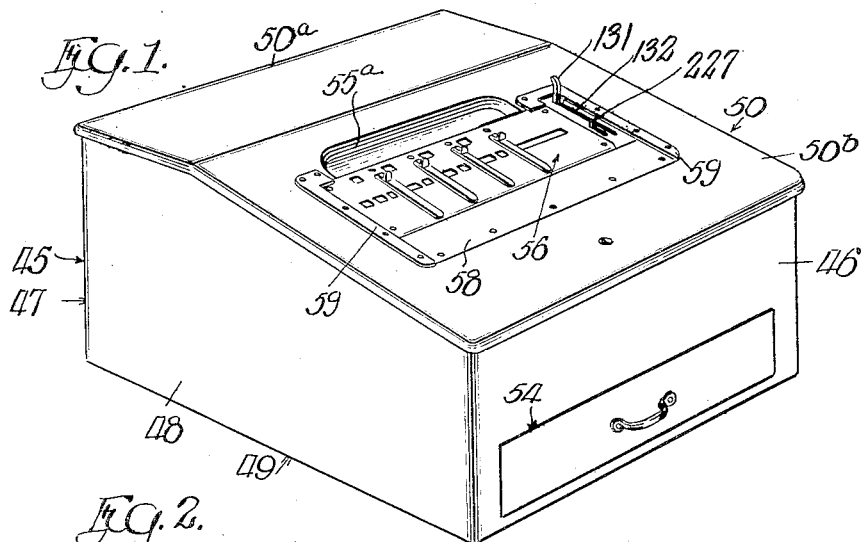
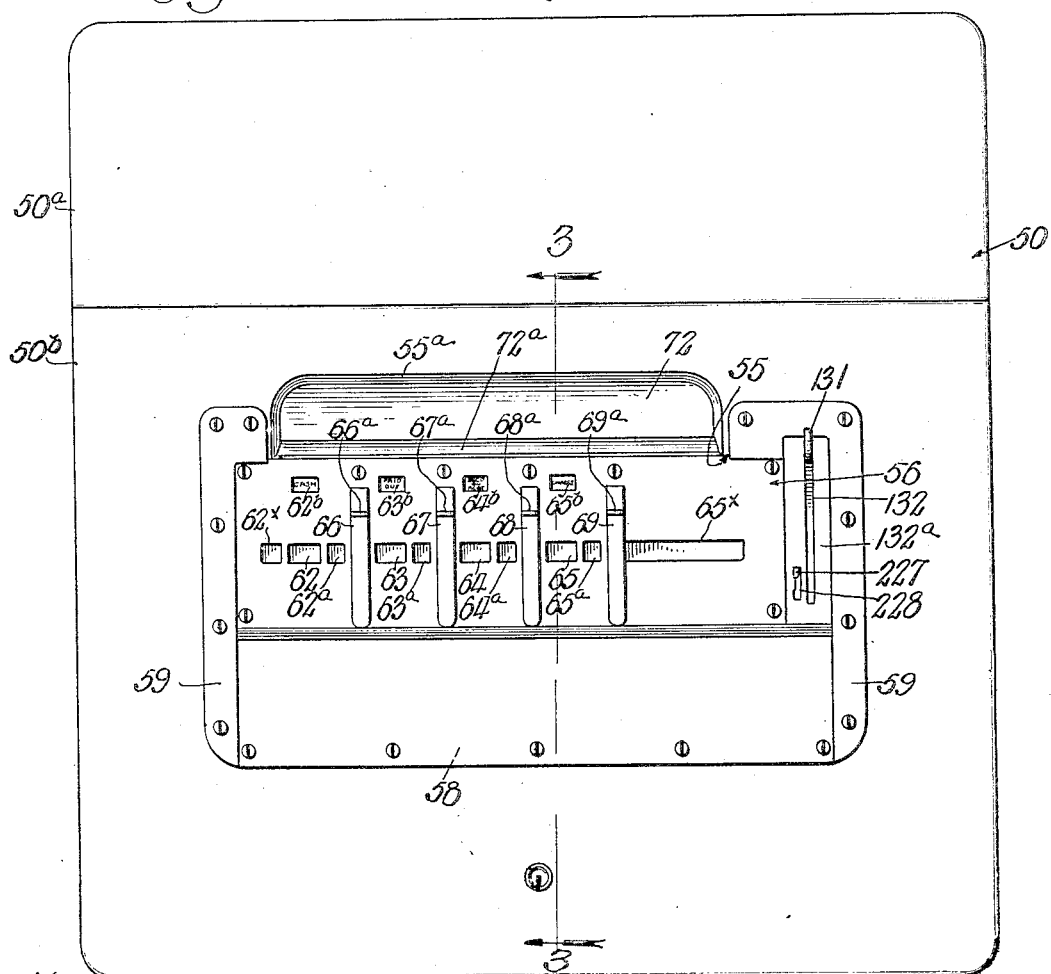

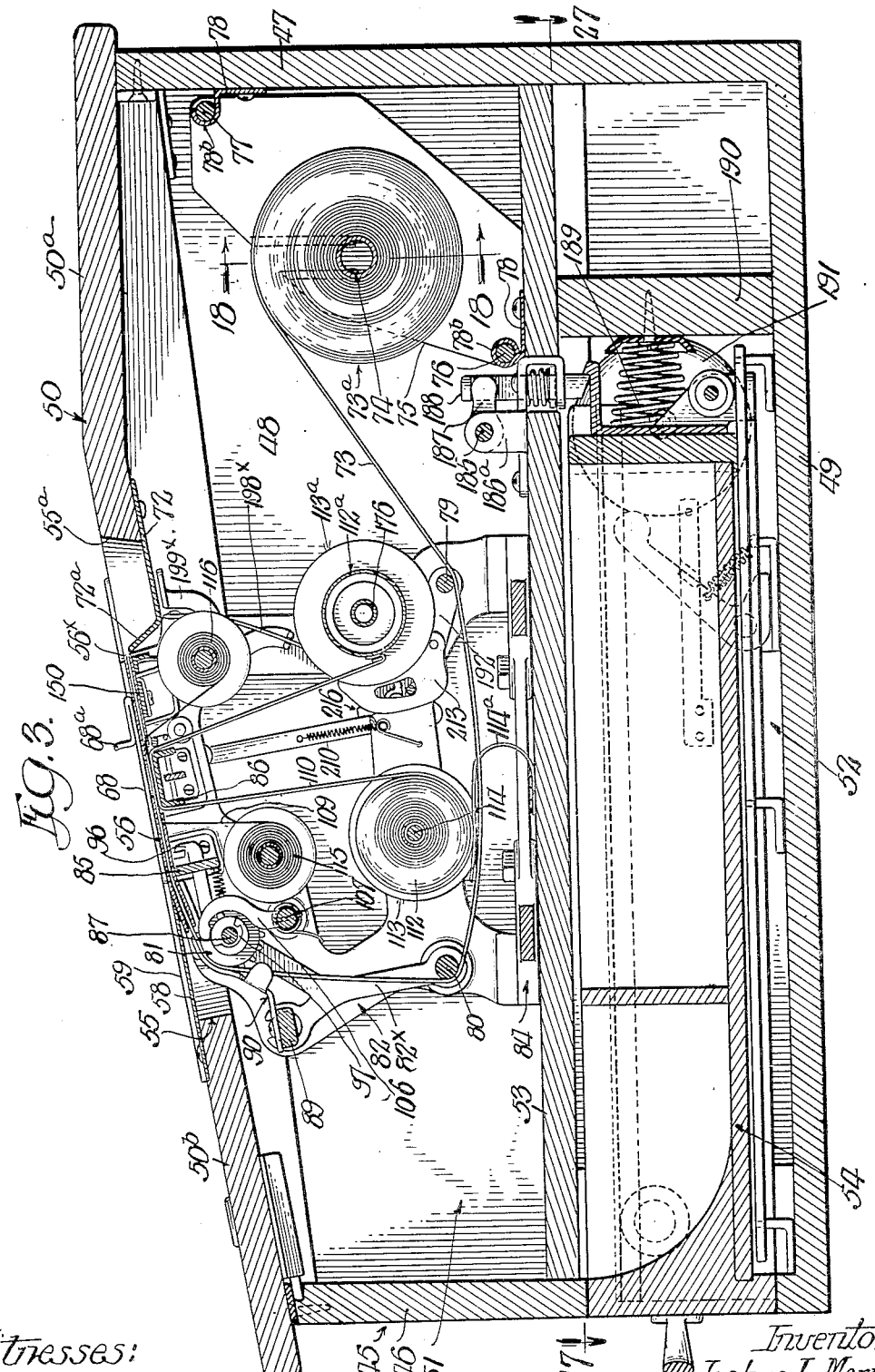

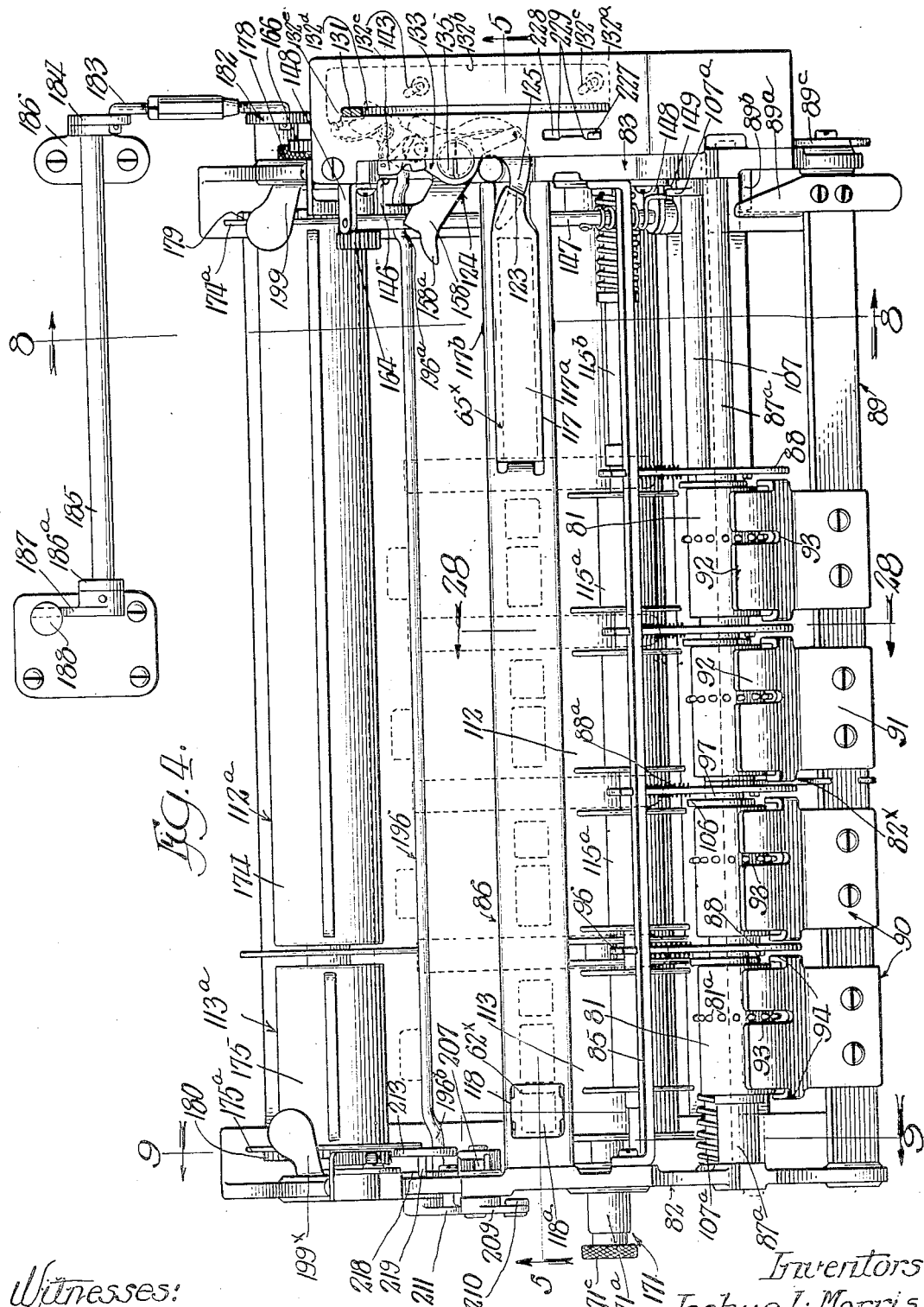

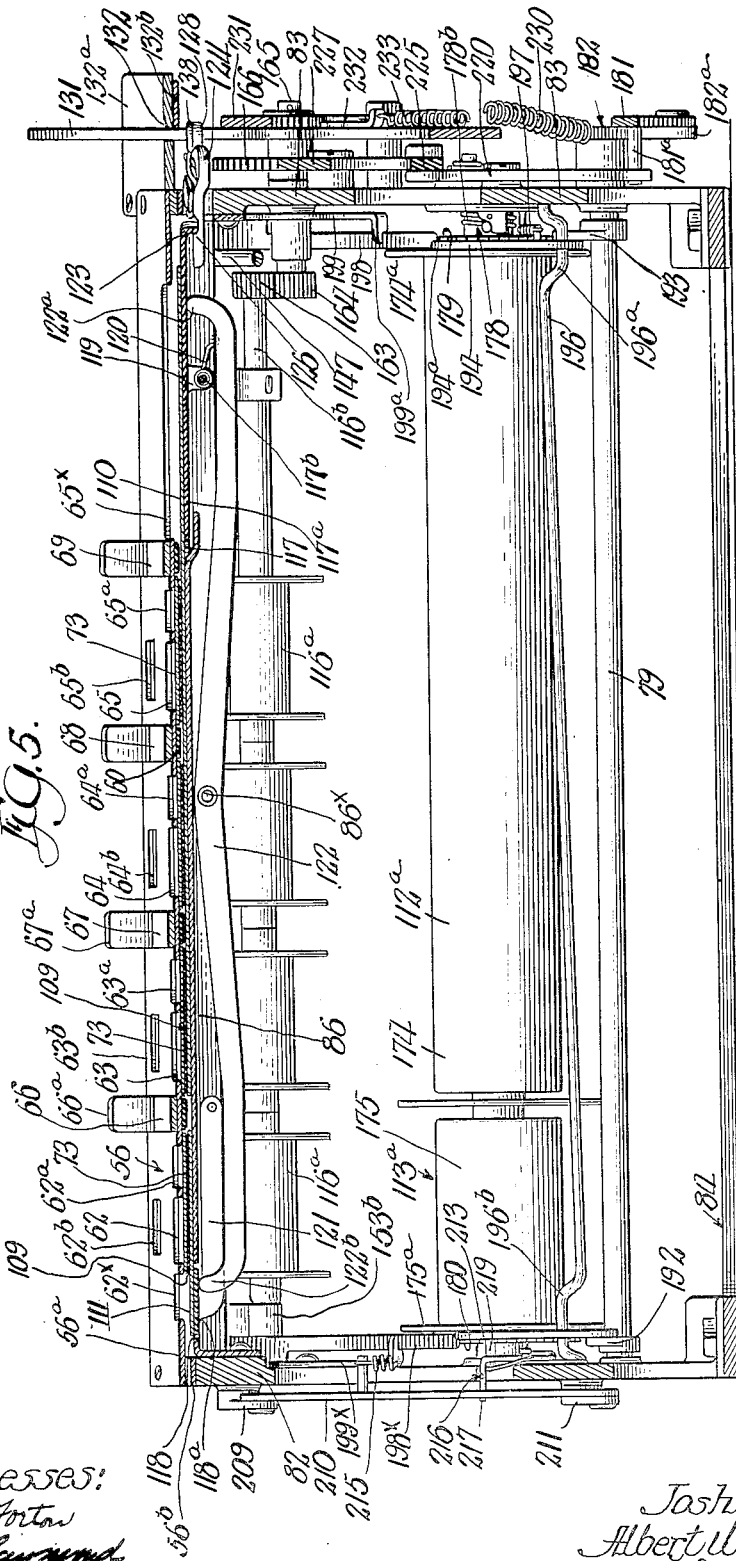

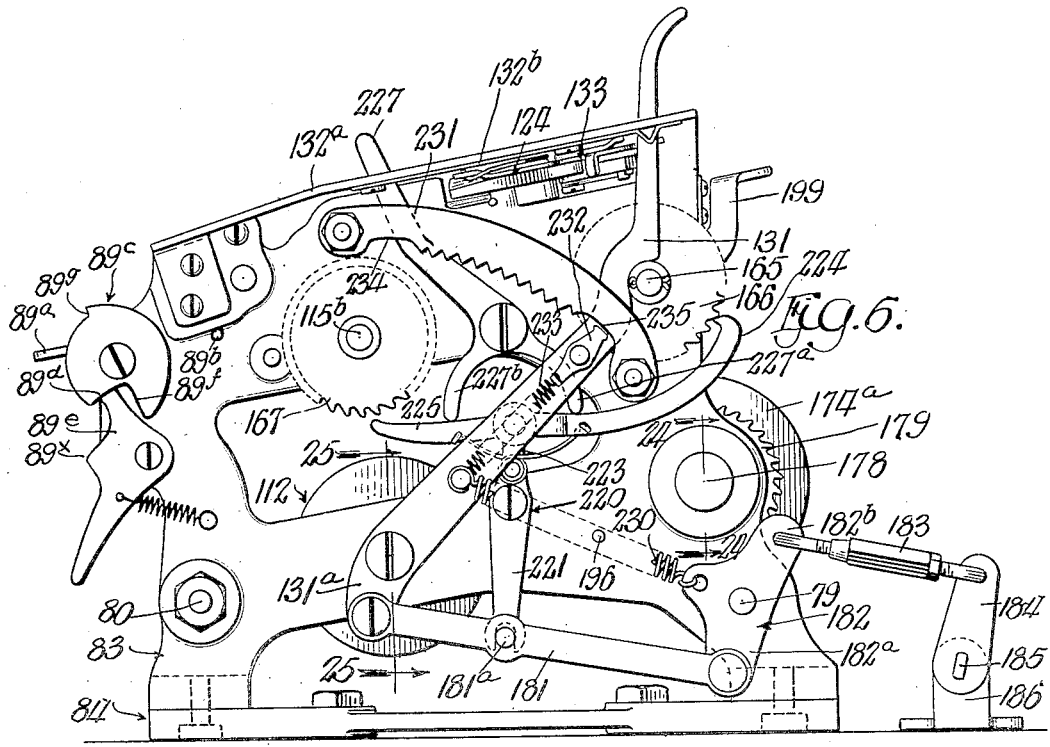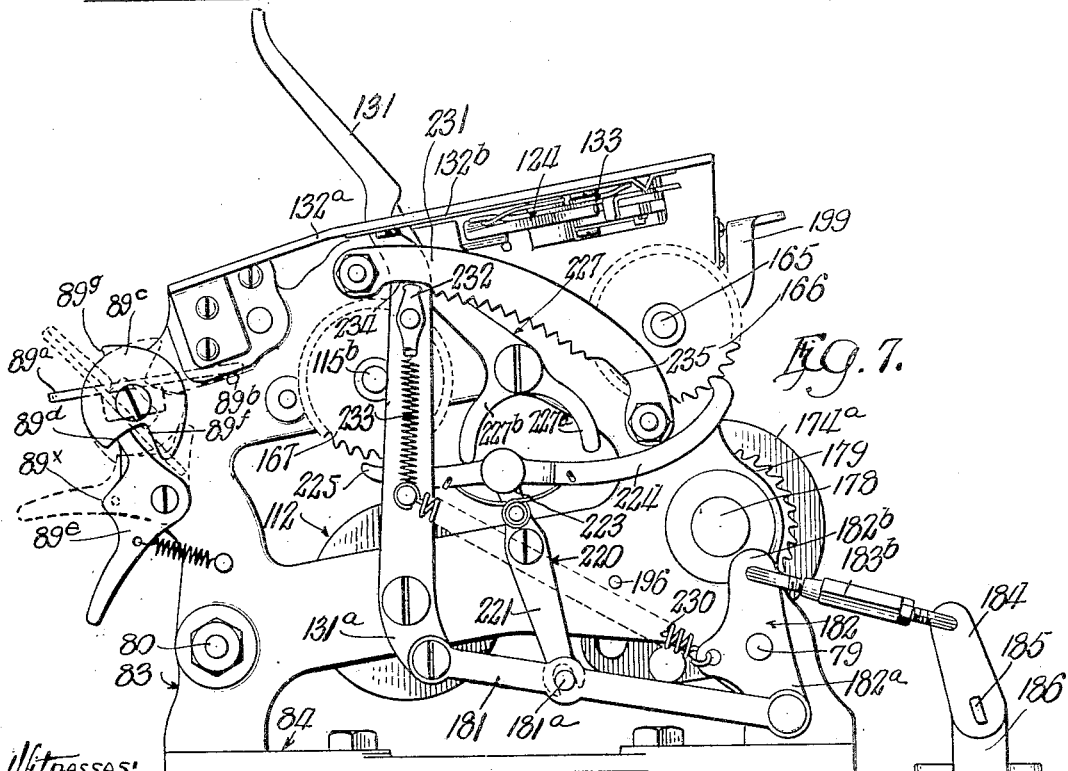

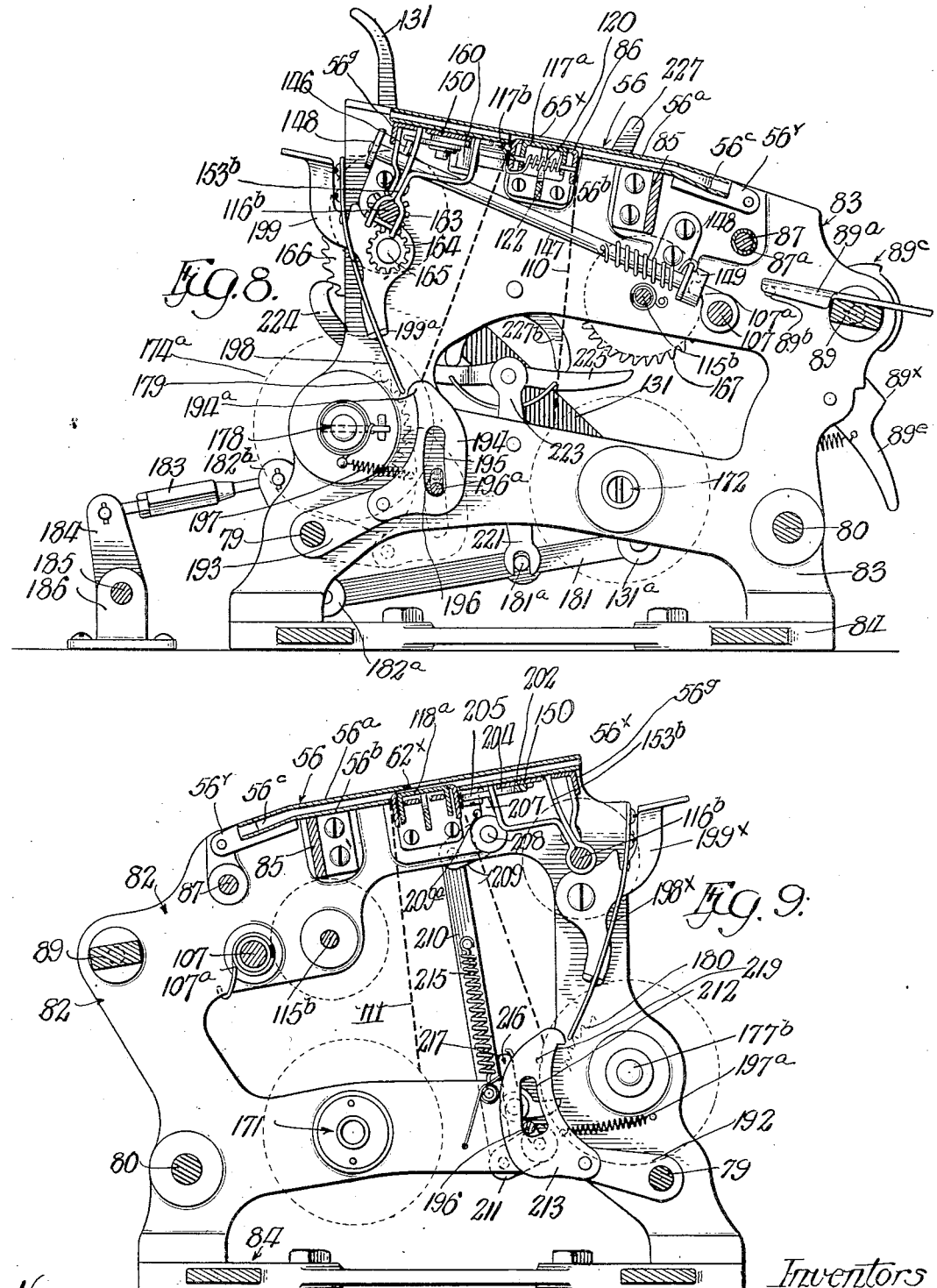

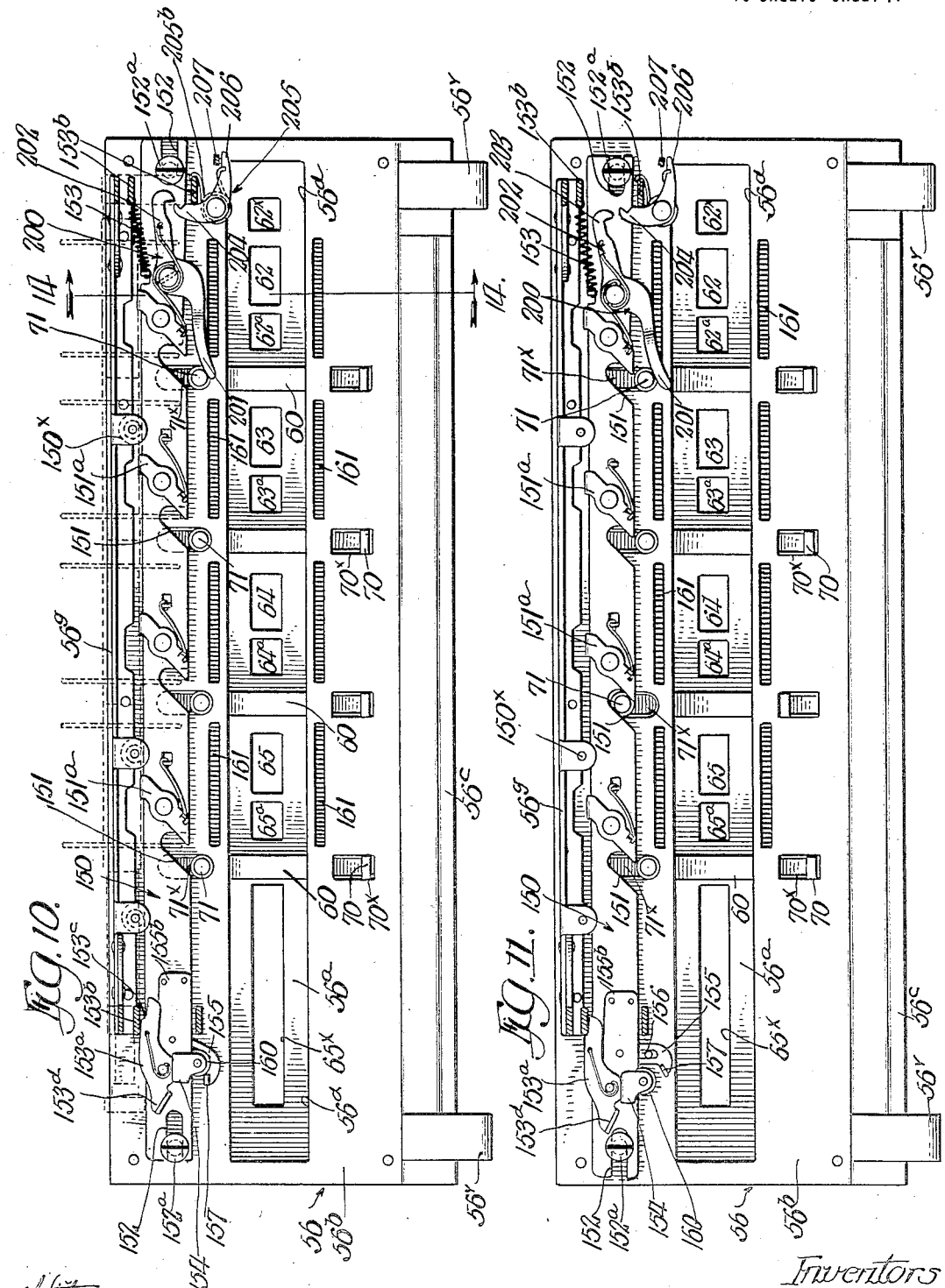

J. L. MORRIS & A. W. LARIMORE.
CASH REGISTER.
APPLICATION FILED SEPT. 28, 1915.
1,292,354.
Patented Jan. 21, 1919.
15 SHEETS—SHEET 8.
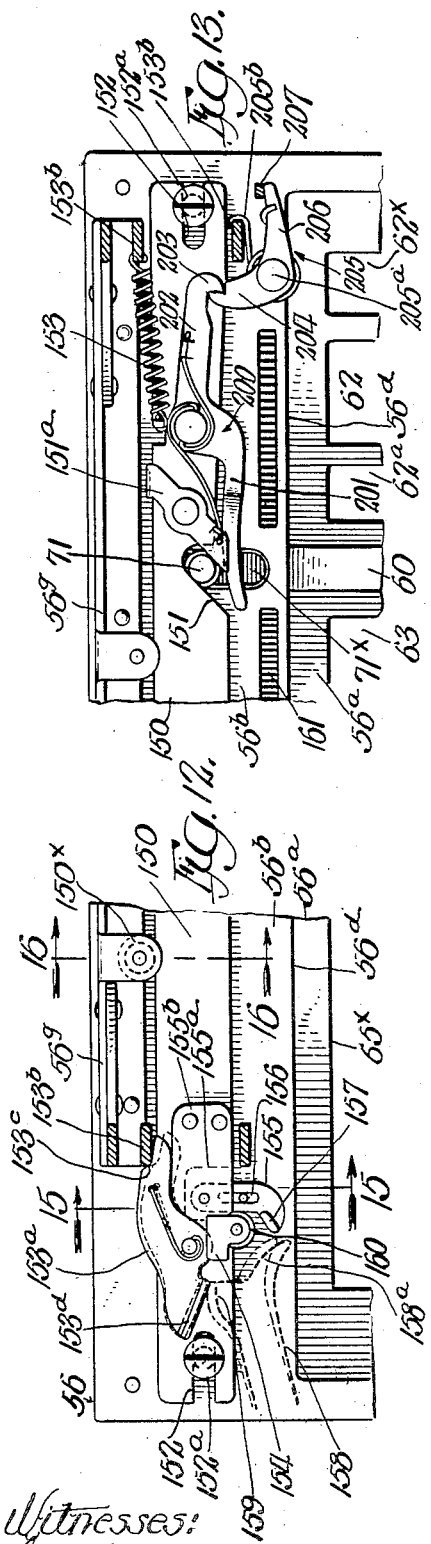
Witnesses:
G. M. Fortow
R. A. Raymond
Inventors
Joshua L. Morris
Albert W. Larimore
by Burr & Mehlhope Attys J. L. MORRIS & A. W. LARIMORE.
CASH REGISTER.
APPLICATION FILED SEPT. 28, 1915.
1,292,354.
Patented Jan. 21, 1919.
15 SHEETS—SHEET 9.
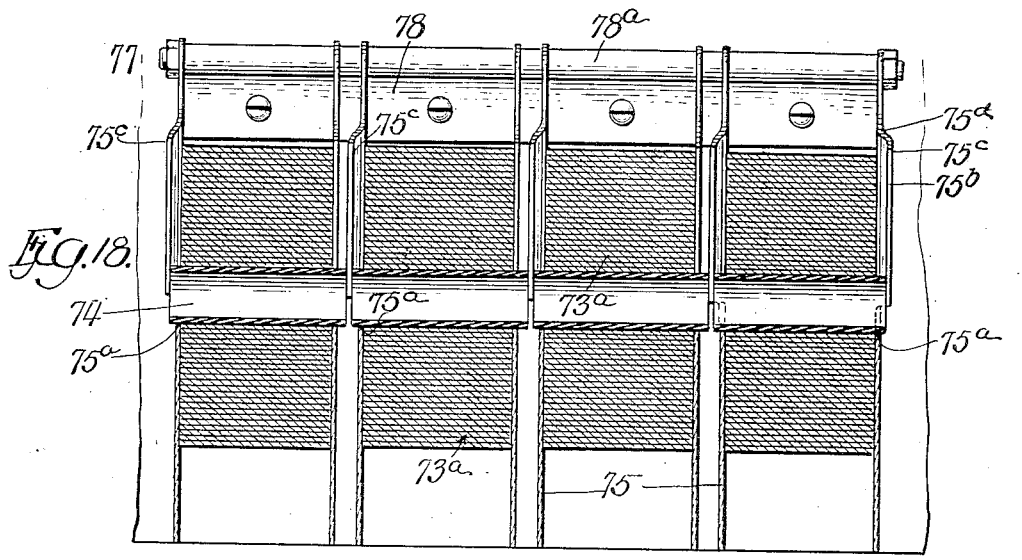
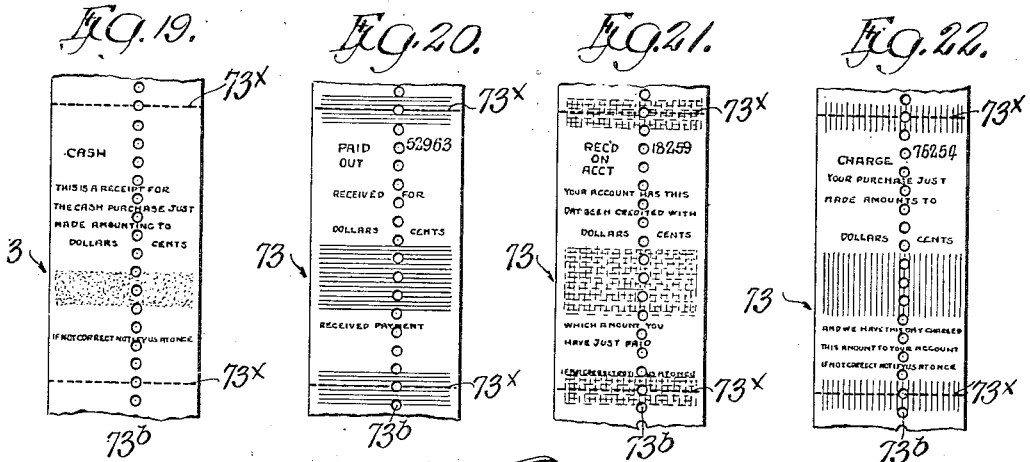
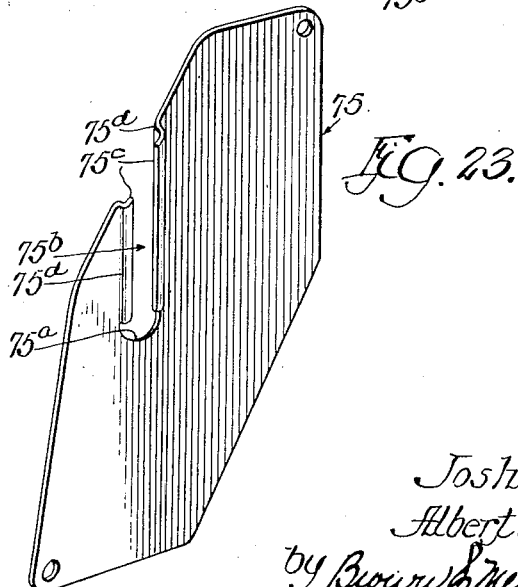

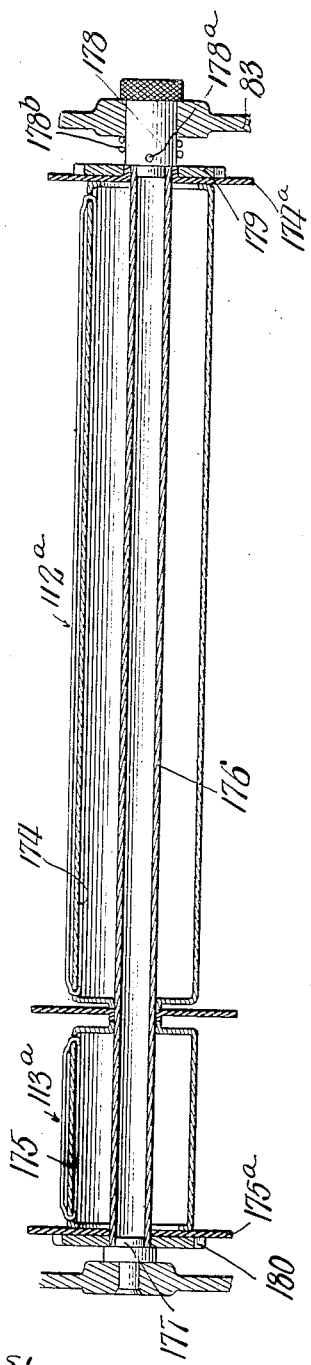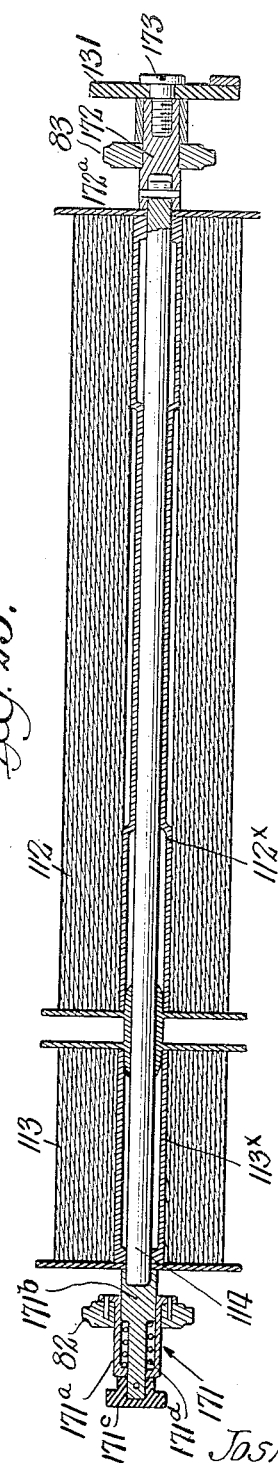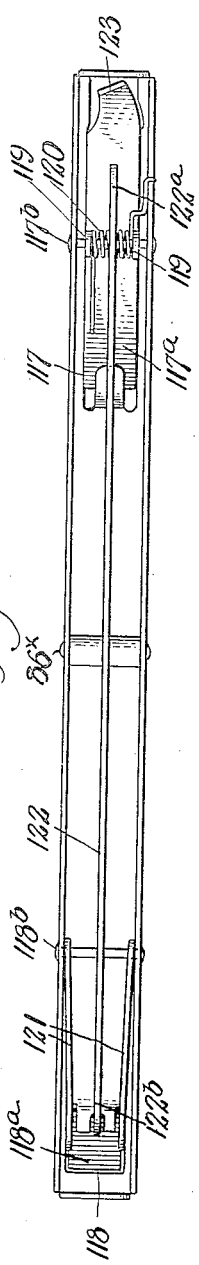

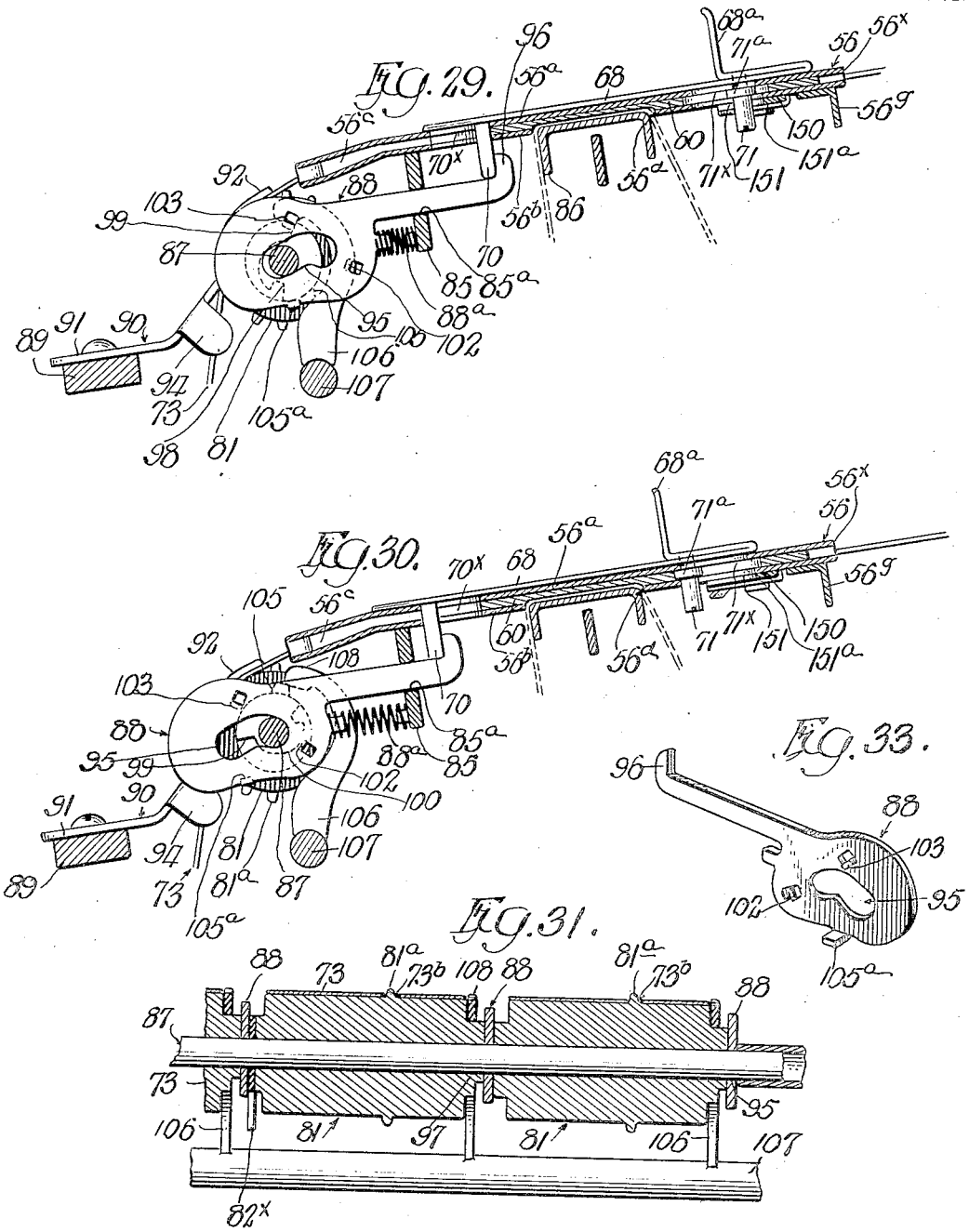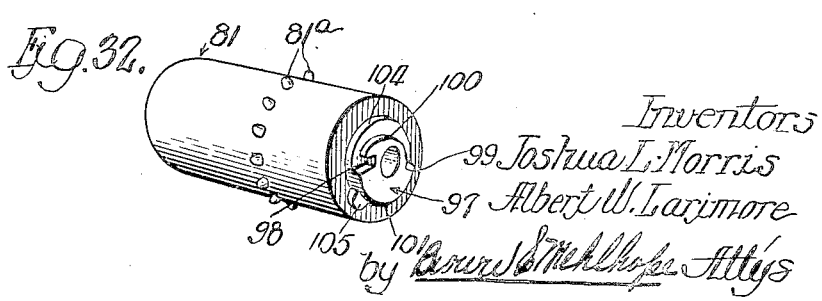

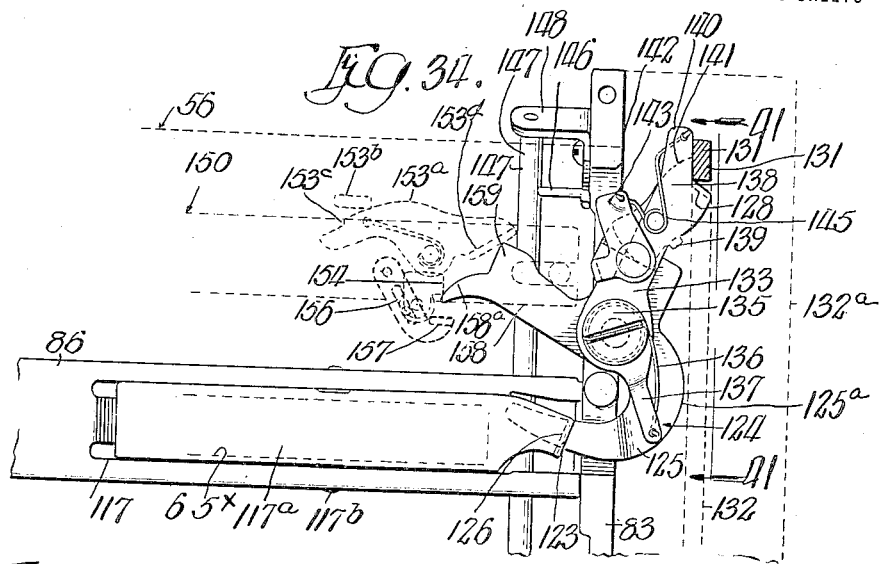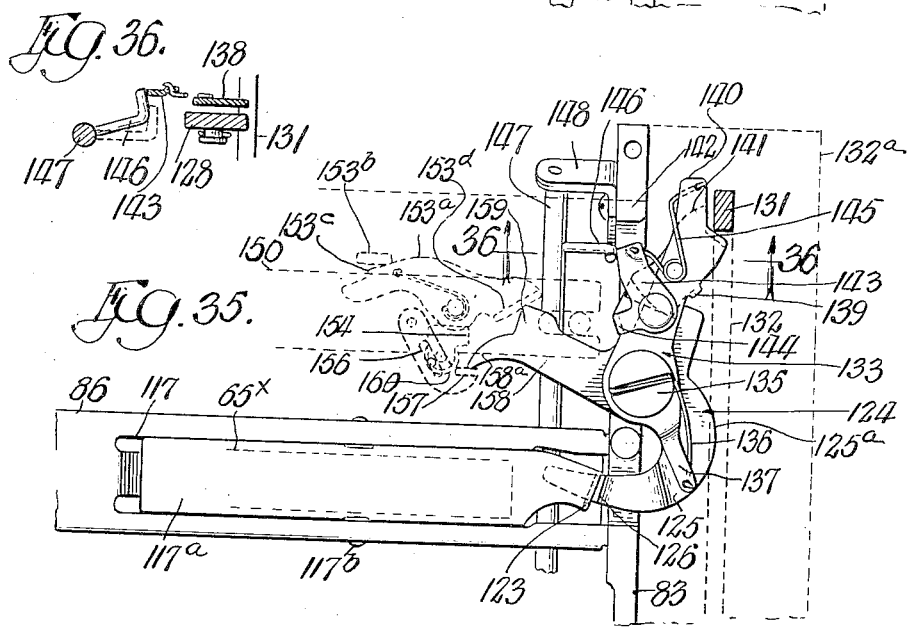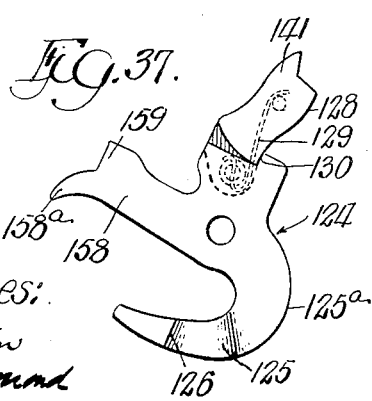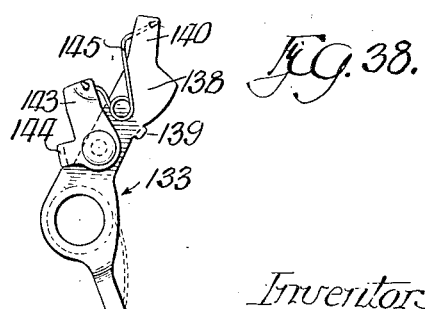

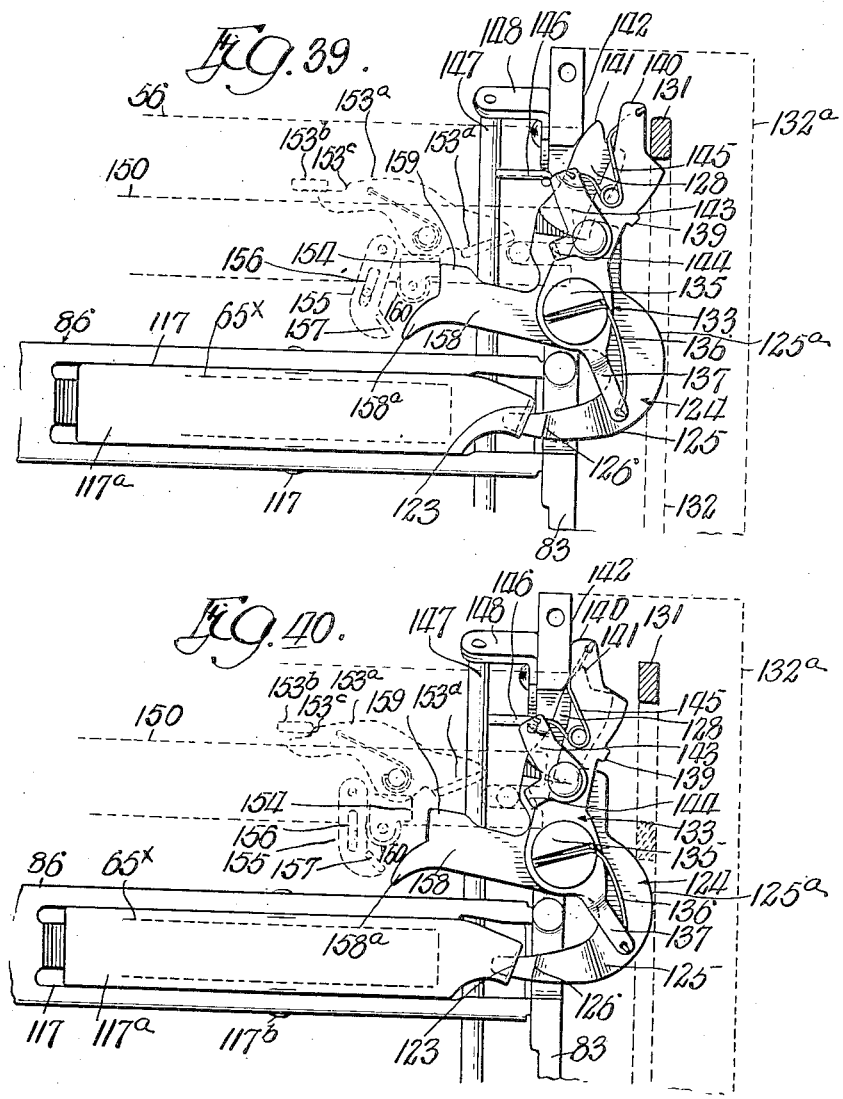

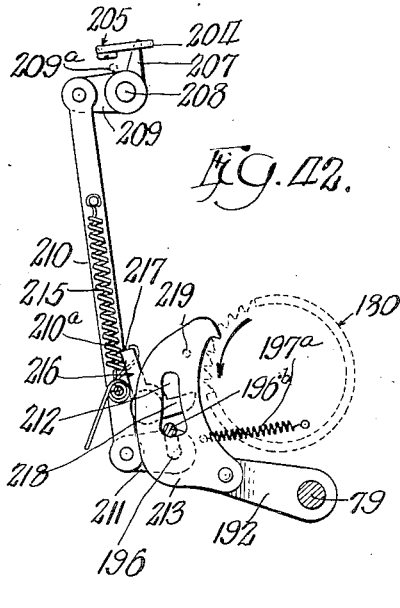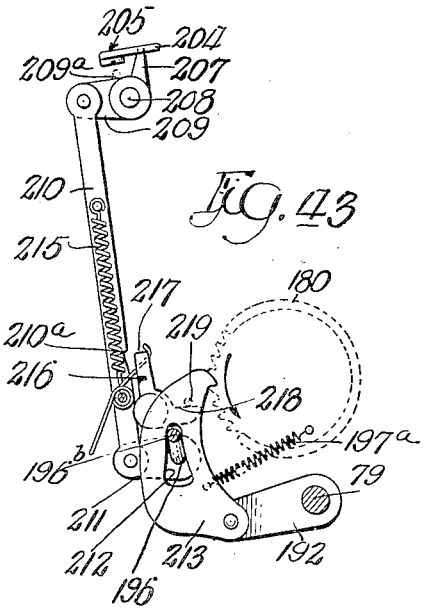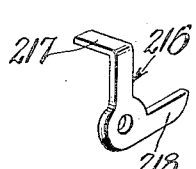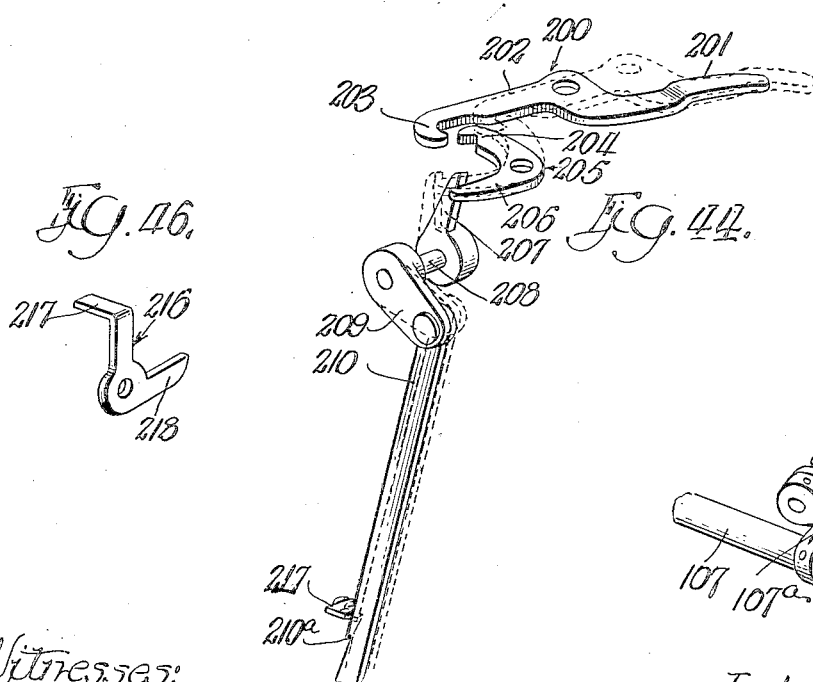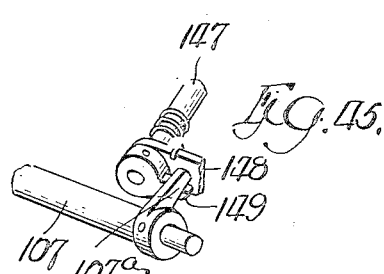

UNITED STATES PATENT OFFICE.

JOSHUA L. MORRIS AND ALBERT W. LARIMORE, OF COUNCIL BLUFFS, IOWA; SAID MORRIS ASSIGNOR OF HIS RIGHT TO MORRIS CASH AND CREDIT REGISTER COMPANY, OF OMAHA, NEBRASKA, A CORPORATION OF MAINE.

CASH-REGISTER.

1,292,354.      Specification of Letters Patent.      Patented Jan. 21, 1919.

Application filed September 28, 1915. Serial No. 53,041.

*To all whom it may concern:*

Be it known that we, JOSHUA L. MORRIS and ALBERT W. LARIMORE, citizens of the United States, and residents of Council Bluffs, in the county of Pottawattamie and State of Iowa, have invented certain new and useful Improvements in Cash-Registers; and we do hereby declare that the following is a full, clear, and exact description thereof, reference being had to the accompanying drawings, and to the letters of reference marked thereon, which form a part of this specification.

This invention relates to improvements in cash registers and consists of the matters hereinafter described and more particularly pointed out in the appended claims.

The object of the invention is to improve and simplify the construction and operation of a cash register of the type illustrated in U. S. Letters Patent No. 1,101,317 issued to Joshua L. Morris on June 23d, 1914.

In carrying out our invention we provide check strips for the usual transactions,—as "cash," "charge," "received on account" and "paid out" items; an individual record strip upon which a copy of each "cash" transaction is produced; and a second, main record strip upon which a copy is produced of each "charge," "received on account" or "paid out" transaction. Each record strip is exposed at one place to receive directly the signature, initials or mark of the clerk or party making the transaction. Our improved cash register is so constructed and its operating mechanism is so arranged that it is impossible for the clerk or other person operating the register to open the cash drawer or advance either of the record strips until he has in the first place written his signature, initials or other identifying mark upon the record strip associated with the check that is to be issued to the customer, and in the second place has fully withdrawn the check from the register so that it may be torn from its strip and issued to the customer.

The improved register also has other improvements and advantages that will be pointed out more particularly as we proceed with our specification.

In the drawings:—

Figure 1 is a perspective view of a cash register made in accordance with our invention.

Fig. 2 is a top plan view of the same on an enlarged scale.

Fig. 3 is a view representing a central vertical section on a further enlarged scale through the cash register in a plane indicated by the line 3—3 of Fig. 2.

Fig. 4 is a top plan view on a still larger scale of the interior mechanism of our improved cash register.

Fig. 5 is a vertical transverse sectional view through the interior mechanism of our improved cash register, the plane of the section being indicated by the line 5—5 of Fig. 4.

Fig. 6 is a view in elevation of the interior mechanism of our improved cash register as looked at from the right hand end thereof.

Fig. 7 is a view similar to Fig. 6 with the parts in changed relation.

Fig. 8 illustrates a vertical longitudinal section through the interior mechanism of our improved cash register, in a plane indicated by the line 8—8 of Fig. 4.

Fig. 9 illustrates a similar sectional view, the plane of the section being indicated by the line 9—9 of Fig. 4.

Fig. 10 illustrates a bottom plan view of the cover plate, showing the mechanism attached thereto.

Fig. 11 illustrates a similar view with the parts in changed relation.

Fig. 12 illustrates on an enlarged scale a fragmentary detail bottom plan view of the upper left hand corner of said cover plate, as viewed in Figs. 10 and 11.

Fig. 13 is an enlarged detail bottom plan view of the upper right hand corner of said plate with the mechanism attached thereto in a changed relation.

Fig. 14 is a detail sectional view on an enlarged scale, the plane of the section being indicated by line 14—14 of Fig. 10.

Figs. 15 and 16 are detail sectional views through the cover plate, the planes of said sections being indicated by the lines 15—15 and 16—16 respectively of Fig. 12.

Fig. 17 is a detail plan view of a longitudinally movable bar carried on the under side of said cover plate and will be more specifically referred to later.

Fig. 18 illustrates a vertical sectional view through the check strip rolls and their supports, the plane of said section being indicated by the line 18—18 of Fig. 3.

Figs. 19, 20, 21 and 22 illustrate plan views of fragments of the "cash," "paid out," "received on account" and "charge" check strips, respectively.

Fig. 23 is a perspective view of a plate forming the support and bearing for said check strip rolls.

Fig. 24 is a view representing a detail section, the plane of the section being indicated by lines 24—24 of Fig. 6.

Fig. 25 is a similar view, the plane of the section being indicated by lines 25—25 of Fig. 6.

Fig. 26 illustrates a bottom plan view of a platen member embodied in our improved cash register.

Figure 27:
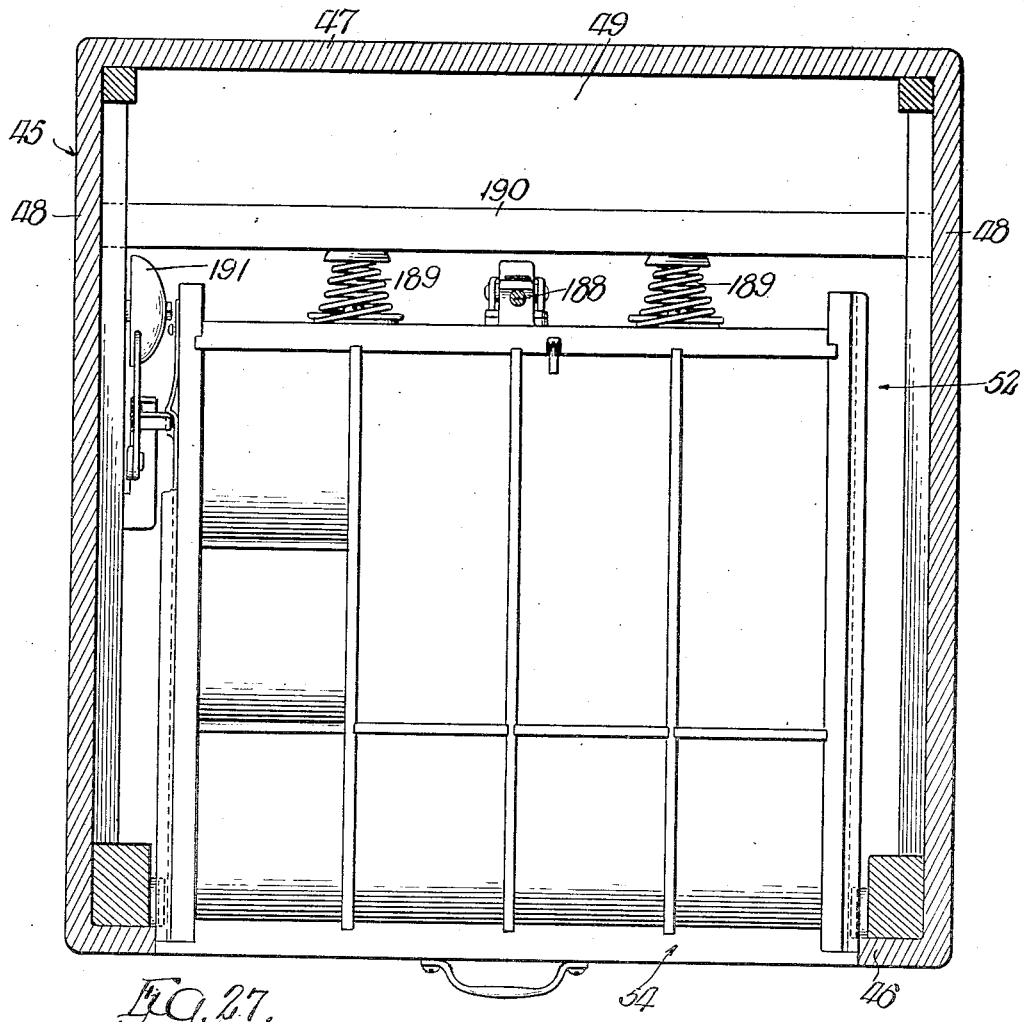

Fig. 27 is a view representing a horizontal section through our improved cash register in a plane indicated by line 27—27 of Fig. 3.

Figure 28:
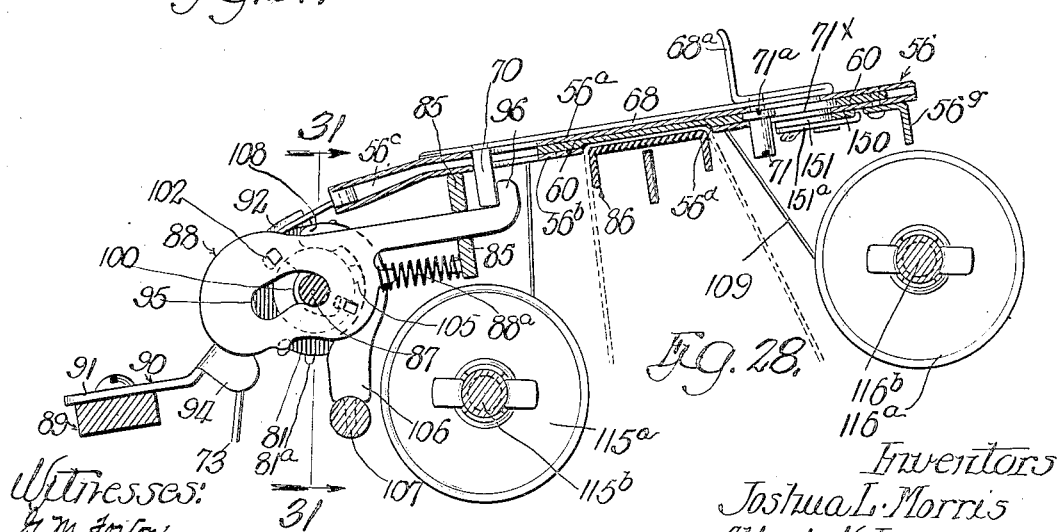

Fig. 28 is a vertical detail sectional view through the cover plate and check strip feeding means, the plane of the section being indicated by lines 28—28 of Fig. 4.

Fig. 29 is a similar view with the parts in changed relation.

Fig. 30 is a view similar to Fig. 29 with the parts in a further changed relation.

Fig. 31 illustrates a vertical detail section in a plane indicated by lines 31—31 of Fig. 28.

Fig. 32 is a perspective view of a check strip feed roll.

Fig. 33 is a perspective view of a check strip feed roll operating lever.

Fig. 34 is a detail plan view on an enlarged scale of the main operating lever controlling means and embodies that part of the mechanism illustrated at the right hand end of Fig. 4.

Fig. 35 is a similar view with the parts in changed relation.

Fig. 36 illustrates a detail sectional view taken in a plane indicated by lines 36—36 of Fig. 35.

Fig. 37 illustrates a top plan view of the main operating lever controlling trigger.

Fig. 38 illustrates a top plan view of an auxiliary trigger associated with said main operating lever controlling trigger.

Fig. 39 is a view similar to that illustrated in Fig. 35 with the parts in a still further changed relation.

Fig. 40 is a similar view with the parts in a further changed relation.

Fig. 41 is a detail end elevation of the parts illustrated in Fig. 34 as viewed in the plane indicated by lines 41—41 of said figure.

Fig. 42 is a diagrammatic view of parts illustrated in Fig. 9 when said parts are in changed relation.

Fig. 43 is a similar view with the parts in a still further changed relation.

Fig. 44 is a perspective diagrammatic view of parts illustrated in Figs. 42 and 43 respectively, and will be more specifically referred to later.

Fig. 45 is a detail perspective view and will be more specifically referred to later.

Fig. 46 is a detail view in perspective of one of the parts illustrated in Figs. 43 and 44, and will be again referred to later.

Referring now to that embodiment of the invention illustrated in the accompanying drawings:—45 indicates the box or cabinet inclosing the operating mechanism of our improved cash register. Said cabinet has upright front and rear walls 46 and 47 respectively, side walls 48, a bottom wall 49 and a removable top wall 50. The rear part 50$^a$ of the removable top wall 50 is made horizontal while the front part 50$^b$ thereof is inclined forwardly and downwardly for convenience in writing. The top wall 50 is locked in place in the usual way and may be removed only by one in authority. The casing 45 is divided into upper and lower compartments 51, 52, respectively, by means of a horizontal partition board 53.

The upper compartment 51 contains the operating mechanism of the cash register, the check strip feed rolls, the record feed and rewind rolls and the ribbon feed and rewind rolls, and the lower compartment contains the usual spring actuated cash drawer 54, which is capable of being withdrawn in a forward direction.

The inclined front part 50$^b$ of the removable top wall 50 is cut away to provide a transversely elongated opening 55 (see Figs. 1, 2 and 3), the major part of which is closed by a metallic cover plate 56 having openings through which the several check strips and a part of each record strip are exposed to view so that the same may be written upon by the one using the cash register.

The said plate is hinged, as will appear more particularly later, to the frame which supports the mechanism of the cash register inclosed within the cabinet. The balance of said opening is covered by a marginal plate 58 extending parallel to the plate 56 and by marginal plates 59, 59 extending transversely of the ends of both of the plates 56 and 58 and adjacent thereto,—the said plates 58 and 59 being attached to the part 50$^b$ of the top of the casing.

The cover plate 56 is duplex and comprises parallel, vertically spaced, sheet metal plates 56$^a$, 56$^b$, which are arranged throughout the greater part of their forward and backward length in planes parallel to the plane of the inclined part of the top wall of the cabinet, but are inclined downwardly near their forward edges and are somewhat diverged to provide an inlet opening 56ᶜ for the easy entrance of the check strips in a manner later to be described. (See Fig. 14.)

The space between the two sheet metal plates 56ᵃ, 56ᵇ, is divided into a plurality of laterally spaced, forward and backward extending channels, by means of spacing bars 60 (see Figs. 10 and 28), which are riveted to the said plates. A sufficient number of said bars are provided to form a channel for each one of the check strips designed for use in the machine,—there being in the example illustrated, four of said bars; and also bars at the ends as clearly illustrated in Fig. 10. A transverse angle bar 56ᵍ is fixed to the bottom of the duplex cover plate 56, adjacent its rear margin to prevent sagging of said plate.

In the top member 56ᵃ of the cover plate 56 there are formed (as illustrated in Fig. 2), associated openings for dollars and cents for each transaction that the register is designed for, namely, in the present case, "cash," "paid-out," "received on account" and "charge" items. These associated openings are indicated respectively in the order named by the numerals 62, 62ᵃ, 63, 63ᵃ, 64, 64ᵃ, 65, 65ᵃ. Associated with each of these pairs of openings are small openings 62ᵇ, 63ᵇ, 64ᵇ, 65ᵇ, which are located at the rear of the first named openings and are adapted to expose the words "Cash," "Paid-out," "Received on account," and "Charge" printed on the respective checks. In line with the openings 62—65ᵃ, (and to the right thereof as shown), there is provided a long opening 65ˣ, which as will appear later, exposes a part of the main record strip to be directly written upon and on the left near the openings 62, 62ᵃ, there is a second shorter opening 62ˣ, which similarly exposes the cash record strip.

66, 67, 68, 69 indicate slides arranged at the side (preferably at the right, as shown) of each of the said sight and writing openings for "cash," and other items. Said slides, as will appear later, are adapted to provide the preliminary feed of the several checks in order to expose enough of the end of the check to permit its further feed and final delivery to be brought about by the thumb and finger of the one using the cash register. The said slides consist of narrow plates having uprising finger pieces 66ᵃ, 67ᵃ, 68ᵃ, 69ᵃ. Each slide has depending pins 70, 71, which engage in slots 70ˣ, 71ˣ, respectively, in the said duplex plate 56 and one of which, 71, is provided with an annular flange 71ᵃ, which engages between the said plates and holds the said slide from displacement.

The slides 66—69 are capable of a rearward movement, that is to say, a movement in the direction that the check is to be fed and are adapted to feed a short length of the strip beyond the rear edge 56ˣ of the top leaf of the duplex plate 56, which constitutes a tearing edge against which the check may be torn from the check strip of which it is a part, when the full length of the check is withdrawn beyond said edge.

The opening 55 in the removable top wall of the cabinet adjacent the rear tearing edge 56ˣ of the duplex plate is closed by a plate 72 which is attached to the bottom face of the top part 50ᵇ of the casing and is bent upwardly at its forward edge toward the tearing edge 56ˣ. This construction also provides a groove or depression at the rear of the tearing edge for convenience in grasping the projecting ends of the check strip.

All of the check strips, from which the checks are torn to be issued to the customer, are fed in the same manner and by the same means so that a description in the case of one will suffice for all.

Each check strip is fed from a feed roll and the preliminary feed of a small part of it beyond the tearing edge 56ˣ is brought about by the one of the slides 66—69 associated with it, (see Figs. 1 and 9), and the further complete feed of the check is produced by the pull of the thumb and finger on the end part of the check exposed beyond said tearing edge in the preliminary feed.

73 indicates the check strip and 73ᵃ, the supply roll from which it is fed. (See Figs. 3, 18 and 23). Each check strip is mounted on a tubular core 74 located at the rear end of the compartment 51 of the cabinet. The several cores are arranged in line and their ends have bearing in pairs of upright, parallel notched plates 75. As shown, the plates 75 are cut to provide a half round bearing notch 75ᵃ and one plate of each pair is cut above said notch to form a slot 75ᵇ slightly narrower than the diameter of the half round bearing notch. The marginal extensions 75ᶜ at each side of said slot are bent along vertical lines 75ᵈ, that are tangential to the half round bearing notch, to form flanges for engagement with the ends of the cores (see Fig. 18), in such manner as to properly space them and retain them against endwise displacement.

The bearing plates 75 rest at their bottom edges on the horizontal partition board 53 and have suitable apertures at top and bottom sides by means of which they are assembled on rods 76 and 77. Spacing plates 78 with sleeve parts 78ᵇ bearing on said rods, serve to hold the bearing plates in the required spaced relation.

From its supply roll 73ᵃ, each check strip 73 is fed forwardly and downwardly below a transverse rock shaft 79, to be referred to later, and below a transverse rod 80 fixed in the end frame members which support the operating mechanism of the cash register. From the rod 80 the check strips pass upwardly, over, and about feed rolls 81, whence they pass rearwardly through the channels 56ᶜ in the duplex top plate 56, heretofore referred to.

82, 83 indicate upright end frame members which support the cash register mechanism. Said end frames are located near the side walls 48 of the cabinet and are bolted or otherwise secured to a horizontal base frame 84 attached to the partition wall 53. To these end frame members the duplex plate 56 is attached, being hinged thereto by means of lugs 56ʸ (see Figs. 8 and 11) fixed to the forward edge of the cover plate. The tops of the end frames 82, 83 are attached together and held in proper spaced relation by means of a transversely extending bar 85 (see Figs. 3 and 4). Said frames are also connected by a channel bar 86 located about half way between their front and rear ends. The horizontal web of this bar provides the platen over which the several check strips are fed in their passage through the channels 56ᶜ in the duplex cover plate 56. The said bar is arranged with its horizontal web substantially in the plane of the lower member 56ᵇ of the duplex top plate 56, which lower plate is cut away to provide a slot 56ᵈ (see Figs. 8, 9 and 10) to receive said platen bar.

The feed rolls 81 are mounted loosely on a nonrotative horizontal shaft or rod 87 which has its ends fixed in the end frames 82, 83. Said rolls are held in proper assembled position on their shaft by means of end sleeves 87ᵃ, (see Figs. 4 and 31), and are maintained in the required spaced relation by means of plates or arms 88 by which they are actuated and which will be referred to again later. Each feed roll is provided with a plurality of radially extending teeth 81ᵃ arranged at equal arcuate distances about its peripheral surface. Each check strip 73 has a line of holes or perforations 73ᵇ (see Figs. 19 to 22), which are spaced longitudinally at distances equal to the arcuate distances between the teeth 81ᵃ on the feed rolls and are of such size as to fit the said teeth. As the check strip passes over the feed roll, the perforations in the check strip are engaged on the teeth of the feed roll and by this means the length of check strip fed may be accurately and positively determined by the angle through which the feed roll is rotated.

The following tension device is provided for holding the check strips in proper engagement with the feed rolls 81, and their teeth 81ᵃ. A transversely extending bar 89 (see Figs. 3 and 4) is located forward of and slightly below the shaft 87 on which said feed rolls are mounted. Said bar has rotative bearing at its ends in the end frames 82, 83, and is supported intermediate its ends by a Y-shaped bracket 82ˣ mounted at its lower end on the transverse rod 80. (See Fig. 3). Said bracket also provides intermediate support for the feed roll shaft 87.

A plurality of laterally spaced springplates 90 are fixed to said bar, there being one of said plates for each feed roll. Each plate has a flat heel part 91 for attachment to the bar 89 and an upwardly and rearwardly inclined and curved part 92 for yielding engagement with the check strip as it passes over the feed roll. Said curved part is bifurcated as indicated at 93 to accommodate the check strip engaging teeth 81ᵃ on the feed roll, and has depending flanges 94, 94, at the sides for guiding engagement with the lateral edges of the check strip. Said flanges are located somewhat below the feed roll and act to so direct the path of travel of the check strip as to insure the proper engagement of the perforations 73ᵇ therein with the teeth 81ᵃ on the feed roll.

At the right hand end of the bar 89 adjacent the end frame 83 is fixed an arm 89ᵃ which normally engages a stop pin 89ᵇ projecting laterally from said frame. (See Fig. 4). Said bar 89 projects beyond the frame 83 where it has fixed to it a cam 89ᶜ. (See Figs. 6 and 7).

The cam 89ᶜ has a shoulder 89ᵈ which is normally engaged by a spring controlled pawl 89ᵉ in such manner as to hold the arm 89ᵃ in engagement with the pin 89ᵇ. In this position the tension device engages the check strips as described. The cam 89ᶜ has a second shoulder 89ᶠ adjacent to and opposing the shoulder 89ᵈ and a tooth 89ᵍ spaced arcuately from it. The cam and pawl 89ᵉ are so constructed that a movement of the pawl 89ᵉ from the position shown in full lines to the position shown in dotted lines (Fig. 7) will raise the tension device from the feed rolls so that they may be gotten at when installing new check strips. This, of course, can only be done after the top wall of the cabinet has been removed. After the tension device has passed through a vertical position, gravity will swing it until the tooth 89ʸ engages a heel 89ˣ on the pawl 89ᵉ, and arrests the tension device. The device is brought back to operative position by hand.

For each of the slides 66—69 and its associated feed roll 81, there is provided one of the operating arms 88 which is mounted on the shaft 87, (see Figs. 28, 29 and 30), in line with but below the slide and next adjacent on the right to the end of the feed roll. The said arm 88 has a bayonet slot 95 near its forward end, through which the shaft 87 extends, and which controls the direction of movement of said arm adjacent the feed roll. At its rear end the arm has an upright lug 96 that engages back of the forward, depending pin or lug 70 on the bottom side of the associated slide 66—69.

Said arm has guiding engagement near its rear end in a slot or hole 85ª in the transverse bar 85 that connects the tops of the end frames together and an expansion coiled spring 88ª engages between said bar and a fixed part of the arm in such manner as to normally hold said arm in its forwardmost position. The arm 88 in turn holds its associated slide in its forwardmost position.

At the end of each feed roll 81, in a plane adjacent (on the left) to the associated arm 88 is fixed or formed a cam 97 with its axis of rotation coaxial with that of the feed roll. Said cam has a radial notch 98, a radial shoulder 99, which is located substantially diametric with reference to said notch, and oppositely disposed cam surfaces 100, 101, (the first being of small and the other being of larger radius) intermediate said notch and shoulder. On the face of the arm 88 adjacent to and projecting into the plane of the cam 97 are formed laterally extending lugs 102, 103—the one, 102, being placed to the rear and a little below the bayonet slot 95, and normally engaging with the notch 98, and the other, 103, being located above and toward the forward end of said cam slot and being adapted for engagement with the radial shoulder 99.

In the plane adjacent to the cam 97, on the left, there is fixed or formed on the end of the feed roll 81 a circular cam disk 104 which is coaxial with said barrel and which carries a radial cam lug 105. With each cam disk there is associated a rock arm 106 (see Fig. 28) that extends upwardly at the rear of but in the vertical plane of said disk and that is fixed to a horizontal rock shaft 107 extending transversely of the cabinet and having bearing at its ends in the end frames 82, 83. There is one such rock arm for each feed roll, and each rock arm is curved forwardly about its associated cam disk and carries at its upper end a detent 108 with an arcuate bearing of certain length that normally engages the cam disk. The rock shaft 107 is spring controlled, a coiled spring 107ª at its left hand end normally holding it in such position that the detents 108 of the rock arms engage the cam disks of the several feed rolls as described. When any one of the detents 108 is struck by the cam lug 105 of its associated cam disk, the rock arm is rocked toward the rear and with it the rock shaft, 107, and said rock arm and rock shaft remain in this position during the short interval until the cam lug has passed the detent, when the rock shaft and rock arms are returned to their initial position by the aforesaid spring 107ª. The arm 88 has, in addition to the lugs 102, 103, a longer lug 105ª, which projects into the path of the cam lug 105 and coacts therewith in a manner later to be described.

The operation of each slide, 66—69, of its associated arm 88, cam 97, cam disk 104 and feed roll 81, is as follows: With the slide 66—69 in its normal, forwardmost position, before the check strip has been fed rearwardly to issue a check, the lug 102 on the arm 88 is engaged in the notch 98 of the cam 97 (see Fig. 28), so that the cam, and with it the feed roll 81 to which it is fixed, is locked against rotation in either direction. In the beginning the slide 66—69 itself is locked against movement by mechanism yet to be described, and can only be released by a certain act to be performed by the operator, as will presently appear; but after the slide is released, it may be pushed rearwardly to the full limit of its movement. By this movement of the slide, the arm 88 is pulled rearwardly, and the several associated parts are moved from the position shown in Fig. 28, to the position shown in Fig. 29. The initial movement of the arm 88, withdraws the lug 102 from the notch 98 of the cam 97, thus releasing the feed roll 81. The further movement of said arm brings the lug 103 into engagement with the radial shoulder 99 of the cam 97 and said lug thereafter coacts with said shoulder to rotate the cam and with it the feed roll 81,—the bayonet cam slot 95 causing the lug 103 to follow the required arcuate path. When the arm 88 has been drawn rearwardly to the full limit of its movement, the lug 105 on the cam disk 104 (which, as shown in Fig. 28 in dotted lines is at the rear), has been rotated to a lower position where it is engaged by the lug 105ª on the cam arm 88, as illustrated in Fig. 29. This arrests the movement of the feed roll and any pull on the arm 88 after this, being exerted both through the lug 103 on the radial shoulder 99 of the cam and through the lug 105ª on the cam lug 105, is manifestly inoperative to rotate the feed roll. Thus the length of the check strip fed by the movement of the slide and its associated part thus described, is accurately fixed and determined, as the angle through which the feed roll rotates determines the length of the check strip fed, as heretofore pointed out. The check strip is thus fed beyond the tearing edge 56ˣ. No further feed by means of the slide and cam arm 88 is then possible.

When the feed slide is released, the slide and arm 88 are returned forwardly by the coiled spring 88ª, until arrested by the lug 102 on the arm 88 striking the cam surface 101 of the cam 97. In this position, the lug 105ª of the arm 88 is removed from the path of the cam lug 105 on the cam disk 104 and the feed roll is free to rotate to permit the feed of the check strip toward the rear. The end of the check strip projecting beyond the tearing edge 56ˣ of the cover plate 56 may now be grasped by the thumb and finger, and the check strip withdrawn a further distance beyond said tearing edge. The rearward pulling movement of the check strip, by reason of the engagement of the perforations of the check strip with the teeth of the feed roll rotates the feed roll and the cam 97 and cam disk 104. As the cam lug 105 passes under the detent 108 of the rock arm 106 (see Fig. 30), it causes said arm to be rocked as heretofore described. The lug 102 rides on the cam surface 101 of the cam 97, guiding the arm 88 in the direction of the bayonet slot 95, and then on the cam surface 100, until it finally comes to engage in the notch 98 and locks the feed roll against further movement. All of the parts referred to are then in their initial normal position as illustrated in Fig. 28. It will be manifest that in the movement of the parts just described, the feed roll has been caused to make one complete revolution. The check strip has been fed a distance exactly equal to the circumference of the feed roll and thus the lines of weakening 73$^x$ (see Figs. 19-22) dividing the strip into checks are in each case brought to the tearing edge 56$^x$, after one of said lines has first been made to coincide therewith.

The check strips, the ribbon and the record strips are fed over the platen bar 86 (see Fig. 3), being arranged upon the same in the order named, so that when any one of the check strips is written upon, a copy of the writing is produced on the associated record strip. 110 indicates a main record strip and 111 indicates a cash record strip (see Fig. 5). Said record strips pass side by side over the platen 86 in direct contact therewith and below the check strips, and together cover substantially the full length of the platen. They are fed respectively from supply rolls 112, 113, loosely mounted end to end on a shaft 114, extending parallel to the platen and suitably supported in the end frame members 82, 83, and are rewound on rolls 112$^a$, 113$^a$, by means presently to be described. The several check strips pass below the record strip supply and rewind rolls. The record supply rolls 112, 113, are yeildingly held against rotative movement on the shaft 114 by means of leaf spring 114$^a$ fixed to the partition wall 53. (See Fig. 3).

109 indicates a plurality of ribbons, one for each check strip. Said ribbons are fed over the platen bar 86 between the check strips and the record strips and are fed from supply rolls 115 and are rewound on rolls 116 as described later. The means by which said ribbons are advanced at each operation of the register will be described presently.

The platen 86 is provided at its right hand end below the opening 65$^x$ in the cover plate with a long, longitudinally extending slot 117 (see Fig. 4) and at its left hand end below the opening 62$^x$ in the cover plate with a shorter slot 118. In the right hand slot 117 is located a flat lever plate 117$^a$. Said lever plate in its normal position has its top face substantially in the plane of the platen surface and is fulcrumed intermediate its ends to the platen bar 86. (See Figs. 4, 5 and 26). As shown said plate has depending ears 119 which bear upon a fulcrum pin 117$^b$ fixed in the side flanges of the channel forming the platen bar. The lever plate 117$^a$ is spring controlled,—a spring 120 coiled about the pin 117$^b$ and fixed at one end to a side flange of the platen bar and engaged at its other end against the bottom face of the plate to the left of the pin acting to normally hold the left hand end of the plate in its highest position.

In the left hand smaller slot 118 of the platen is located a second flat lever plate 118$^a$. Said lever plate likewise in its normal position has its top face in the plane of the platen surface. It is mounted on laterally spaced arms 121, 121, which extend as shown toward the right below the platen bar and are fulcrumed on a transverse pin 118$^b$ fixed in the side flanges of said bar. A pivotal beam 122 mounted on a transverse pin 86$^x$ fixed in the side flanges of the platen bar at a point intermediate the two lever plates, has one end 122$^a$ which engages against the bottom of the lever plate 117$^a$ at a point to the right of its fulcrum and the other end 122$^b$, which engages against the bottom of the lever plate 118$^a$ at a point to the left of its fulcrum. Thus the spring control of the lever plate 117$^a$ is transmitted to the lever plate 118$^a$,—the spring 120 tending to hold both plates in their highest positions—and the two plates are thus so connected that if pressure is brought to bear upon the left hand lever plate 118$^a$, the same lifting effect on the right hand end of the lever plate 117$^a$ is produced as where pressure is produced on the left hand end of said lever plate 117$^a$,—namely, the imparting of a lifting movement to the right hand end of said lever plate 117$^a$. This movement is communicated to a depending pawl 123 located at the right hand end of the lever plate 117$^a$, the function of which will presently appear.

At the right end of the platen bar in a plane somewhat below its surface but substantially parallel thereto, is mounted a trigger 124. (See Figs. 34 and 37.) Said trigger is pivoted on the right hand end frame member 83 to swing or oscillate in a plane parallel to the platen surface. Said trigger has at its forward end an arm 125 which curves so as to extend into the space between the side flanges of the platen bar, to the left beyond the pawl 123 at the end of the lever plate 117ª. Said pawl normally engages a transverse shoulder or tooth 126 on the arm 125 of the trigger in such manner as to lock the trigger against movement. The trigger has a rearwardly extending heel 128, which is not rigid with the main body of the trigger, but which consists of a separate part pivoted to said body, with a spring 129 and engaging shoulders 130 constructed in a familiar manner so that the trigger proper will be swung to the left through a short arc by the spring 129 without carrying the heel with it, and until the shoulders 130 are engaged.

The trigger acts to lock the cash drawer releasing lever against movement. 131 indicates said lever (see Figs. 1, 6 and 34), which is upright and has other functions than that of releasing the cash drawer to be described later and which is capable of a swinging movement in a vertical plane in a slot 132 formed in a metal plate 132ª fixed to the top of the frame 83 adjacent the end of the opening 65$^x$ and exposed through an opening between the right hand end of the hinged cover plate 56 and the adjacent fixed plate 59. The heel part 128 of the trigger is normally engaged with the lever 131 so as to prevent its being swung toward the front of the cabinet. Said lever is also locked against movement by an auxiliary trigger 133 (see Fig. 38) which is mounted coaxially with and on top of the trigger 124. A screw 135 having bearing parts of different diameters provides the pivot for the two triggers. A spring 136 fixed to the head of the screw and connected with an arm 137 of the auxiliary trigger 133 at a point forward of the screw, tends to swing said trigger toward the left. Said trigger 133 also has a heel part 138 which engages the front edge of the lever 131 and which in this case is rigid with the body of the trigger. A detent 139 on the auxiliary trigger is adapted to engage the right hand edge of the heel member of the main trigger so that when the latter is swung to the right, the auxiliary trigger will be swung with it. Both triggers are provided with extensions 140, 141, respectively, on their heel members adapted for engagement on the one hand with the side of the lever 131 to limit their movement in one direction and adapted for engagement on the other hand with a stop 142 fixed to the end frame member 83 to limit their movement in the other direction.

The auxiliary trigger 133 carries a spring controlled pawl 143 which projects on its left and is limited in its movement to the left on said trigger by a stop lug 144 and is capable of yielding movement toward the right,—a spring 145 being interposed between said pawl and the extension 140 of the heel member 138 of the trigger. In the path of this pawl 143 normally stands an arm 146 fixed to a rock shaft 147 (see Figs. 4 and 34) that extends toward the front of the register in a direction parallel to the end frame 83. Said shaft is mounted in suitable brackets 148, 148 fixed to said frame member and is spring controlled (see Fig. 4). It carries at its forward end a rock arm 149 which is engaged by an arm 107ª arranged at right angles to it and fixed to the rock shaft 107 that is actuated by the rock arms 106, as hereinbefore described, when the check strip is fully withdrawn beyond the tearing edge 56$^x$. Thus, when any one of the check strips is withdrawn the full length of the check to be delivered, the arm 146 is rocked out of the path of the pawl 143 on the auxiliary trigger, which, if the main trigger is out of the road, is then swung to the left by the spring 136.

The triggers above described coact with the following mechanism: To the bottom of the metal cover plate (see Fig. 10) at the rear of the line of slots 62$^x$—65$^x$ is attached a bar 150, which is capable of longitudinal movement in a direction parallel to said line. Said bar is provided on its forward edge with a plurality of inclined cam edges 151,— there being one such cam edge associated with each check strip feed slide 66—69, and said cam edge being adapted to be engaged by the depending part or pin 71, which forms one of the attaching and guiding devices for said slide, when said slide is pushed rearwardly. The bar 150 is attached to the bottom face of the cover plate by means of headed screws 152ª, which engage in longitudinally extending slots 152 at the ends of the bar. The rear margin of said bar engages under antifriction rollers 150$^x$ carried by ears made integral with the reinforcing angle bar 56$^g$. (See Figs. 10 and 16.) Said rollers act to prevent buckling of the bar 150 intermediate its ends. A coiled spring 153 connects a fixed lug on the bar with a fixed part on the cover plate in such manner as to hold said bar in the position nearest the right hand end of the cover plate when looking at the bottom as in Fig. 10, or the left hand end of the cover plate when looking at the top, as in Fig. 4. The cam edges are so inclined that when engaged by the pin of one of the check feed slides, in the rearward feeding movement thereof, the bar 150 will be moved in a direction opposite to the direction of the force exerted by the spring, that is to say, in a direction toward the location of the triggers 124, 133.

On the bottom of the bar 150 adjacent the main and auxiliary triggers 124, 133, there is pivotally mounted a spring controlled stop pawl 153ª, which normally bears against a stop post 153$^b$ made rigid with the cover plate. The post in this case is one of the supports for the ribbon mechanism to be referred to later. The stop pawl has a tooth 153ᶜ which is adapted to engage with the edge of the post and lock the bar 150 against a return movement toward the left, that is to say, movement away from the triggers, when, by means of one of the check feeding slides, it has been actuated to move to the right toward the triggers.

The main trigger 124 has a cam arm 158, with a toe 158ᵃ, which normally engages against a lug 154 fixed to the bottom side of the movable bar 150, and thus locks said bar against longitudinal movement. As the bar 150 is locked against movement, it is manifest that all of the feed slides are locked against movement, since said bar with its inclined cam edges 151 stand in the path of the pins 71 on said slides.

A pivoted arm 155 is carried by the bar 150 adjacent the lug 154. As shown in Figs. 12 and 15, the bar 150 is cut away to provide a notch 155ᵃ and the arm is pivoted in this notch, a plate 155ᵇ being attached to the bar and providing a support for the pivot of the arm 155. This construction brings the arm into the plane of the main trigger 124. Said arm has a pin and slot engagement 156 with the cover plate and has a lug 157 that normally stands in the path of the toe 158ᵃ of the main trigger as said trigger is swung to the left. (See Fig. 34). When the bar 150 moves toward the trigger, the pin and slot connection 156 of the arm 155 with the cover plate, causes the arm 155 to swing the lug 157 out of the path of said toe 158ᵃ.

The stop pawl 153ᵃ has an upturned inclined edge 153ᵈ, which, in the normal position of the parts and before the bar has been moved toward the right, engages against an extension 159 on the cam arm 158 of the main trigger.

In the first instance, the several parts last described, including the main and auxiliary triggers, the lever plate 117ᵃ, the arm 155 and the stop pawl 153ᵃ are in the positions indicated in Fig. 34, wherein the lever plate 117ᵃ is in the plane of the platen surface, its detent 123 is engaged with the tooth 126 of the main trigger, the heel parts 128, 138 respectively of the two triggers are engaged in front of the lever 131 to lock it against forward swinging movement, and the toe 158ᵃ of the cam part 158 of the main trigger is engaged against the lug 154 so as to lock the bar 150 against longitudinal movement toward the triggers, said bar 150 in turn, as has been pointed out above, locks the feed slides against movement, thus preventing the preliminary feed of any one of the check strips.

As has been pointed out, the lever plate 117ᵃ lies beneath the slot 65ˣ, which exposes a part of the main record strip. Upon the depression of the left hand end of the lever plate 117ᵃ, which will occur when the exposed part of the main record strip is written upon, the detent 123 at the right hand end of said lever plate will be lifted and disengaged from the tooth 126 on the main trigger. This releases the body of the main trigger. Thereupon the auxiliary trigger 133, actuated by the spring 136, produces, by means of its depending lug 139, a slight swinging movement of the main trigger toward the left, bringing the toe 158ᵃ of the cam arm 158 forwardly out of the path of the lug 154 on the bar 150, this movement being arrested by the lug 157 on the pivotal arm 156. (See Fig. 36). The movement of the two triggers is slight and is not sufficient to remove their heel parts 128, 138 from locking engagement with the lever 131. This slight movement also brings the spring controlled pawl 143 into engagement with the rock arm 146 on the rock shaft 147.

The toe 158ᵃ of the main trigger being now no longer engaged against the lug 154 on the bar 150, said bar is now capable of movement, and manifestly a movement of any one of the check feed slides rearwardly will impart a movement to said bar 150 toward the triggers. An anti-friction wheel 160 is carried by the bar 150 below and a little to one side of the stop lug 154 (as illustrated, said friction roll has bearing in said stop lug) and as the bar 150 is moved to the right, this friction roll engages the cam arm 158 and swings said cam arm and with it the body of the main trigger farther to the left, the pivotal arm 156 swinging out of the path of the toe 158ᵃ to permit this movement. This brings the parts into the position shown in Fig. 39. The movement of the bar toward the right, that is to say, toward the triggers, is limited by the engagement of the lug 154 thereon, with the extension 159 of the cam arm of the main trigger. This movement of the body of the main trigger has also removed the yielding heel part 128 of the main trigger from the path of the lever 131, said part being brought to bear against the stop lug 142 which thus arrests the further swinging movement of the trigger.

The lever 131, however, is still locked by means of the auxiliary trigger 133, which is locked against movement by reason of the engagement of the pawl 143 carried by it with the rock arm 146 on the shaft 147.

The check strip being now in a position to be grasped by the thumb and finger, is withdrawn as heretofore described to the full length of the check beyond the tearing edge and in this movement, as we have pointed out, the shaft 107 is rocked and this rocking movement is communicated to the rock shaft 147 so as to remove the arm 146 from the path of the pawl 143. Thereupon the spring 136 actuates the auxiliary trigger to swing it to the left until it is arrested by the engagement of its extension 140 with the stop 142, which movement removes its heel part 138 likewise from the path of the lever 131, which is now free to be swung forwardly as shown in Fig. 40.

The pawl 153$^a$ acts to prevent the bar 150 from immediately returning to its initial position and acts to retain it in the position shown in Fig. 40 until the check which has been partially fed by the slide has been fully withdrawn by the thumb and finger from the register. Said bar thus, with certain devices carried by it, to be described presently, locks the other slides that actuate the other check strips against movement. This prevents the issuing of two checks for one transaction and the pawl 153$^a$ operates to produce the result mentioned as follows:

When the bar 150 is moved to its limit toward the right, the tooth 153$^c$ on the pawl 153$^c$ is brought into such position as illustrated in Fig. 39 that when the spring 153 which connects the bar with the cover plate acts to return the bar to its initial position, said tooth will engage the stop post 153$^b$ and arrest the further movement of the bar toward the left, as illustrated in Fig. 40. On the bottom of the bar 150, near each cam edge 151, is carried a spring controlled pawl 151$^a$ (see Fig. 10) which is arranged to project into the path of the pin 71 on the associated slide, when the bar 150 is moved toward the triggers. This pawl will yield to permit the return forward movement of the slide, which has actuated the bar, but will obstruct the rearward movement of the other slides (see Fig. 11).

After the lever 131 has been released in the manner described, it may be swung forward, which movement releases the cash drawer and performs other functions that will be shortly described. In the forward swinging movement of the lever, it strikes a part 125$^a$ of the arm 125 of the main trigger (see Fig. 40), which part is so formed as to come into the path of the lever 131 when the heel part of the trigger has been swung out of the path of the said lever. When the lever strikes this curved part 125$^a$, it acts to swing the main trigger to the right, the arm 125 swinging to the left so as to bring its tooth 126 into reëngagement with the detent 123 on the lever plate 117$^a$. The extension 159 on the cam arm 158 at the same time strikes the turned up edge 153$^d$ of the stop pawl 153$^a$ and swings said pawl from its engagement with the stop post 153$^b$, thereby releasing the bar 150 which is then withdrawn to its original normal position by the spring 153. The movement of the main trigger likewise swings the auxiliary trigger by reason of its engagement with the depending lug 139 on said auxiliary trigger into its initial position. In this movement the spring controlled pawl 143 yields so as to pass the arm 146, which has been again returned to its normal position. The triggers are thus in their original normal position. The lever 131 after it has been pulled forward as far as it may go, is immediately returned, as we shall presently point out, to its original position, the spring 145 on the auxiliary trigger and the spring 129 on the main trigger permitting it to pass by and reëngage behind the heel parts of said triggers.

The slot 132 in the plate 132$^a$ in which the operating lever 131 moves is normally closed by means of a thin, slidable bar 132$^b$ attached to the bottom of the plate 132$^a$, (see Figs. 4 and 5). Said bar has inclined slots 132$^c$ in which the screws which attach it to the plate are engaged. In front of the lever 131, said plate has a shoulder 132$^d$ and back of said lever it has a hook 132$^e$, the latter always extending into the path of the lever, and the former standing in the path of the lever when the lever is in normal position and the plate closes the slot. When the lever is pulled forward it strikes the shoulder 132$^d$ and causes the bar to move to one side out of its path. Where the lever is returned, it strikes the hook 132$^e$ and causes the bar to return to its initial position.

It will be manifest from the description heretofore had with regard to the connection through the beam 122 (see Fig. 5) between the lever plate 117$^a$ and the lever plate 118$^a$, that a writing upon the cash record strip 111 through the opening 62$^x$, will act to depress the lever plate 118$^a$ in the same manner as heretofore described in connection with the lever plate 117$^a$ and that this depression will actuate the right-hand end of the lever plate 117$^a$ to release the detent 123 from engagement with the tooth 126 on the main trigger.

We now pass to a description of the functions of the lever 131 including its function of releasing the cash drawer. Said lever actuates the mechanism which feeds each of the two record strips, that is to say, unwinds them respectively from their supply rolls 112, 113, and rewinds them upon their respective rewind rolls 112$^a$, 113$^a$, and actuates the ribbon mechanism by means of which the ribbons are unwound from one roll and rewound upon a second roll.

Both the supply and rewind rolls of the ribbon mechanism consist of spools designated respectively as 115$^a$, 116$^a$, which are located immediately below the cover plate and above the record supply and rewind rolls. (See Figs. 3, 4 and 5.) Said spools are mounted on shafts 115$^b$, 116$^b$, respectively, being properly spaced thereon by suitable means to correspond with the spacing of the check strips. The ribbons themselves are guided from the supply rolls to the rewind rolls through slots 161 (see Figs. 10 and 14), formed in the bottom plate 56$^b$ of the duplex cover plate 56. The shaft 115$^b$ is journaled in the end frame members 82, 83, and the supply roll spools are frictionally engaged thereon in a familiar manner. The shaft 116$^b$ is mounted in bearing arms 153$^b$ supported by and depending from the bottom side of the hinged cover plate 56. (See Figs. 5, 8 and 9.)

The shaft 116$^b$ and its bearing arms 153$^b$ are made in such manner that the said shaft may be removed from its bearings, so that the spools may be withdrawn endwise from the shaft and be replaced by fresh spools either for the rewind of the ribbon already used from the spools displaced or from new spools. The rewind shaft 116$^b$ terminates at one end short of the right hand frame member 83 and has fixed to that end, a gear 163 (see Figs. 5 and 8). Said gear engages a gear 164 fixed on a stud shaft 165 mounted in the frame member 83. Said stud shaft projects beyond the plane of the end frame 83 where it has fixed to it a ratchet wheel 166. The supply roll shaft 115$^b$ projects beyond the plane of the right hand end frame member 83 and has fixed at its end a ratchet wheel 167 (see Figs. 6 and 7). These ratchet wheels are located in a vertical plane adjacent to the plane in which the lever 131 swings, (as shown, intermediate said plane and the end frame 83), and are operated to feed and rewind the ribbon rolls by the lever 131 as will presently appear.

The record supply rolls 112 and 113 are wound upon arbors 112$^x$, 113$^x$, respectively, (see Fig. 25), which are loosely mounted upon the shaft 114 removably supported in bearing members located in the side frame members 82 and 83 respectively. 171 indicates the bearing member for the said shaft in the frame member 82. Said bearing comprises a barrel 171$^a$ in which is located a spring pressed plunger 171$^b$, the inner end of which is recessed to receive one end of the shaft 114. The outer end of the plunger projects through the outer closed end of the barrel and has fixed to it a knob 171$^c$. A spring 171$^d$ interposed between the outer end of said barrel and a shoulder formed on the plunger normally holds said plunger in bearing engagement with the shaft.

The opposite end of the shaft 114 is split and projects into a recess in a bearing stud 172 fixed in the frame member 83. This recessed end of said stud has a diametric pin 172$^a$, which enters into the split end of the shaft 114 and prevents rotation thereof. Said stud extends beyond the outer face of the frame member 83 and a screw 173 fixed in its end provides the fulcrum for the operating lever 131. When it is desired to remove the shaft 114 for renewal of the record supply rolls, the plunger 171$^b$ is withdrawn from engagement with the shaft 170 by means of the knob 171$^c$, against the action of the spring 171$^d$. The shaft 114 may be then shifted endwise toward the frame member 82 until its opposite end is free from the bearing stud 172, when it may be withdrawn and provided with new supply rolls in a familiar manner.

The record rewind rolls 112$^a$, 113$^a$, are also adapted to be removed from the machine for purpose of removing the record strips therefrom. (See Fig. 24.) The main record roll comprises a relatively long barrel or arbor 174, upon which is wound the general record strip and a relatively shorter one 175, upon which is wound the cash record strip. Both of said barrels are loosely mounted upon a hollow shaft 176 which is supported at its ends upon bearing members mounted on the end frame members 82, 83, respectively. The bearing for the said shaft in the frame member 82 consists of a stud 177 which has a reduced end fitting the hollow bore of the shaft. The bearing for the said shaft in the end frame 83 consists of a yielding bearing stud 178, which projects beyond the outer face of the frame member 83 and is provided with a head by means of which it may be withdrawn away from the associated end of the hollow shaft 176. A spring 178$^b$ surrounding said stud intermediate said frame member and a pin 178$^a$ on said stud normally holds the stud in bearing engagement with the shaft.

The barrels 174 and 175 are provided at their outer ends with radial flanges 174$^a$, 175$^a$, respectively, to the faces of which are secured ratchet wheels 179 and 180. Means are provided coacting with each of said ratchet wheels in such manner that upon movement of the main operating lever 131, rotative movement is imparted to either of said wheels according to whether a "cash" check has been issued or whether a "paid out", "received on account", or "charge" has been issued. In case a "cash" check has been issued upon operation of the main lever 131, a feeding movement is imparted to the cash record rewind roll, and the general record rewind roll remains inoperative. If a "paid out", "received on account", or a "charge" check has been issued, a feeding movement is imparted to the main record rewind roll while the cash record rewind roll remains inoperative. The means whereby this is brought about will appear in the description of the several functions of the lever 131, which we shall now proceed to describe.

The lever 131 is projected downwardly beyond its fulcrum 173 (see Figs. 6 and 7) in the form of a short arm 131$^a$. Said arm is connected by means of a link 181 to one arm 182$^a$ of a double rock arm 182 fixed to the end of the transverse rock shaft 79, which projects beyond the end frame member 83. (See Fig. 5.) To the other arm 182$^b$ of said double rock arm is attached one end of a link 183, the other end of which is connected to a rock arm 184 fixed to the outer end of a transverse rock shaft 185, (see Fig. 4) located back of the main frame. Said rock shaft is mounted in upright bearing brackets 186, 186ª, (see Figs. 4, 6 and 7), secured to the partition board 53, intermediate the record rewind roll 112ª and the rear wall 47 of the cabinet. The inner end of said shaft, which is located at a point intermediate the planes of the end frame members 82, 83, is provided with a horizontal rearwardly extending arm 187 (see Figs. 3 and 4), which engages under the head of a spring controlled cash drawer releasing pin 188. (See Figs. 3 and 4).

The cash drawer 54 is spring controlled, there being provided coiled springs 189, 189, which are interposed between the inner end of said cash drawer and a transversely extending wall 190 in the compartment 52. Thus, when the operating lever 131 is swung toward the front of the cabinet, the arm 131ª thereof will move rearwardly. (See Figs. 6 and 7). This will impart through the link 181, a counter clockwise rocking movement to the double rock arm 182 and the rock shaft 79, and cause a like rocking movement of the rock shaft 185, causing the arm 187 on the inner end thereof to swing upwardly and lift the cash drawer releasing pin 188. After the cash drawer has been released, the springs 189 will cause the same to move forwardly into an open position in a familiar manner, such forward movement of the cash drawer causing a ringing of the indicator bell 191 located in the cash drawer compartment. The cash drawer may then be closed in the usual way.

The rocking movement imparted to the rock shaft 79 by the lever 131, as above described, operates upon the record rolls 112ª or 113ª, to produce a rotative feeding movement thereof as follows: Fixed to the ends of said rock shaft 79 adjacent the inner faces of the frame members 82, 83, respectively, are forwardly extending arms 192, 193, (see Figs. 5, 8 and 9). A pawl 194 is pivoted to the arm 193 and is arranged in the vertical plane of the ratchet wheel 179 (shown in dotted lines in Fig. 8) fixed to the main record roll rewind barrel 174. In said pawl is formed a curved slot 195. A transverse crank shaft 196 (see Fig. 5), having bearing in the end frames 82, 83, is located slightly above and forward of the rock shaft 79. Said crank shaft has near its ends oppositely disposed bent crank arms 196ª, 196ᵇ. The crank arm 196ª is engaged in the slot 195 of the pawl 194, (see Fig. 8), but is normally inoperative to affect the action of the pawl 194 except to guide it toward operative engagement with the ratchet wheel 179. A coiled spring 197 fixed at one end to a pin on the frame member 83, attached at its opposite end to said pawl intermediate its ends, holds the pawl yieldingly engaged with the said crank arm. When the shaft 79 is rocked, as before described by means of the lever 131, the rock arm 193 will swing downwardly causing a like movement of the pawl 194, so that a tooth 194ª at the upper end of said pawl will engage the ratchet wheel 179, and rotate it through an angle sufficient to produce the required feed of the record roll. This movement is clearly illustrated by dotted lines in Fig. 8. When the operating lever 131 is returned to its initial position, the rock arm 193 and the pawl 194 are returned to their normal position.

A flat leaf spring 198 fixed at one end to the front edge of the end frame member 83 near its top is arranged with its free end bearing upon the ratchet wheel to prevent back lash of the rewind roll under the tension of the record strip. A lever 199 journaled as shown upon the stud shaft 165 in a plane adjacent the inner face of the frame member 83, is arranged so that its lower end 199ª embraces said spring. The upper end of said lever is bent over to form a thumb plate so that a pressure may be brought to bear upon said spring 198 to remove its lower end from engagement with the ratchet wheel 179, when it is desired to remove the record rolls.

The feed of the main record roll will be produced as above described when any of the feed slides are operated except the slide associated with the "cash" check strip. When the slide 66 is moved forwardly to feed the cash check strip, the pin 71 thereof will engage the associated cam edge 151 in the bar 150 (see Fig. 10), and actuate said bar to move toward the triggers 124 and 133 as before described. Said pin, however, in addition, brings into play other devices which are normally inoperative. A spring controlled lever 200 is pivoted on the bottom of the bar 150 intermediate its proximate end and the slide 66. (See Figs. 10, 13 and 44). Said lever has an arm 201 which is held normally in engagement with the forward side of the pin 71 of the slide 66. The other arm 202 of said lever is provided with a hook 203 located in the vicinity of one arm 204 of a spring controlled bell crank lever 205, which is pivoted upon a stud 205ª fixed to the bottom of the duplex plate 56 near the end frame 82. Said arm 204 of the bell crank lever is normally held at rest against a stop, (in this case one of the ribbon roll supporting arms 153ᵇ) by means of a spring 205ᵇ, in position to be engaged by the hook 203.

When the cash strip slide 66 is moved rearwardly, the spring controlling the normal position of the lever 200 will act to let the arm 201 follow the depending pin 71 on said slide. This movement will throw the hook 203 on the arm 202 into engagement with the arm 204 of the bell crank lever 205. (See Fig. 13.) Then, as said bar 150 is moved toward the triggers 124, 133 by the pin 71, as before described, the lever moving with it, will act to swing the bell crank lever 205 on its pivotal stud 205$^a$. Just below the bell crank lever 204, a short, horizontal rock shaft 208 is journaled in the end frame 82 in a position forward of the bar 150. Said shaft has an upright arm 207 fixed to its end and projecting into a position to be engaged by the arm 206 of the bell crank lever 205. The other end of said short shaft projects outwardly beyond the frame member 82 and has fixed to it a horizontally extending arm 209, to the end of which is pivotally attached the upper end of an upright link 210. A pin 209$^a$ fixed to the end frame 82 limits the upward movement of the arm 209. The said link is connected at its lower end to an arm 211 which is fixed to that end of the heretofore mentioned crank shaft 196 which has bearing in the end frame member 82. The arm 192 fixed to the rock shaft 79 near the end frame 82 as heretofore stated, has pivoted to it a spring controlled pawl 213 arranged in the plane of the ratchet wheel 180 on the cash record rewind roll 112$^a$, just as in the case of the arm 193. Said pawl 213 has a curved slot 212 in which the crank arm 196$^b$ of the crank shaft 196 engages and the pawl is controlled by a spring 197$^a$. But in this case the crank arm 196$^b$ normally holds the pawl in such position that when the rock shaft 79 is actuated by the pulling forward of the lever 131, the pawl 213, although operated, will not engage the ratchet wheel 180 to rewind the cash record roll.

When, however, upon the operation of the cash feed slide 66, the bell crank lever 205 is actuated, the arm 206 thereof engages the arm 207, rocks the short horizontal shaft 208, swings the arm 209 upwardly and lifts the bar 210, thereby lifting the rock arm 211 at the end of the crank shaft 196 and thus rocking said shaft. This swings the crank arm 196$^b$, so as to release the pawl 213 associated with the cash record rewind roll and swings the crank arm 196$^a$ so as to render the pawl 194 associated with the main record rewind roll inoperative.

Thus when the lever 131 is swung forwardly after the cash slide 66 has been operated, the cash record rewind roll is actuated, while the main record rewind roll remains stationary.

A coiled spring 215 connects the bar 210 with a fixed part of the frame 82 in such manner as to normally hold said bar in its lowest position, with the crank shaft 196 in such angular position that its crank arm 196$^b$ normally holds the pawl 213 inoperative while its crank arm 196$^a$ permits the pawl 194 to act as described.

In order that the bar may be retained in raised position until the pawl 213 has imparted the required angle of rotary movement to the ratchet 180, a spring controlled catch 216 (see Fig. 46) is placed adjacent the pawl 213. Said catch is provided with an angular arm 217 adapted for engagement with a shoulder 210$^a$ on the bar 210, when it is lifted to the necessary level to permit the movement of the pawl as heretofore described, and with an arm 218 which is placed in the path of a pin 219 on the pawl 213. Said catch is pivoted on the frame 82.

When the pawl 213 has been moved through the predetermined distance the pin 219 engages the arm 218 of the catch and rotates its other arm 217 out of the path of the shoulder 210$^a$, permitting the bar and the parts connected therewith to assume their original normal positions under the action of the spring 215. A leaf spring 198$^x$ fixed to the end frame 82 and engaged with the ratchet 180, acts to prevent back lash of the cash record rewind roll. Said spring is held in place and may be disengaged by an arm 199$^x$ pivoted to the frame 82 as in the case of the similar spring associated with the ratchet wheel of the main record rewind roll.

The mechanism by which the ribbon rewind roll is operated through the lever 131 is as follows. On the end frame member 83 (see Figs. 6 and 7) forward of the lever 131 is pivoted a lever 220. Said lever has a depending bifurcated arm 221 which engages a pin or stud 181$^a$ on the main operating link 181. The upper arm 223 of said lever carries a spring controlled pawl 224 adapted for engagement with the ratchet wheel 166 on the stud shaft 165 which operates the rewind of the ribbons and a second spring controlled pawl 225 which is adapted for engagement with the ratchet 167 on the shaft 115$^b$ that carries the ribbon supply rolls. These pawls are controlled by means of a rocking lever 227 which has one arm 227$^a$ adapted to engage the pawl 224 and an arm 227$^b$ adapted to engage the pawl 225. This lever is so arranged that when it is in one position, it will hold one of the pawls out of operative engagement with its associated ratchet wheel, and when in the other position, it will hold the other pawl from operative engagement with its associated ratchet wheel, as clearly shown in Figs. 6 and 7. Said lever extends up through a slot 228 in the plate 132$^a$ at one side of which are provided shoulders 229, 229, (see Figs. 1 and 2), for locking the lever in either one of its required positions. This construction is familiar. When the lever 131 is swung forward, imparting a longitudinal movement to the link 181, as has been described, the lever 220 is swung so as to actuate both the pawls 224, 225. That pawl which is engaged with its associated ratchet wheel will act to feed the ribbon.

After the lever 131 has been swung forward to release the cash drawer, feed the ribbon and actuate the rewind of one of the record rolls, it is automatically returned to its initial position by means of a coiled spring 230 (see Figs. 6 and 7), which connects it with an intermediate part of the double arm lever 182. In order to prevent the lever 131 from returning to its initial position under the tension of the spring 230 until after it has been caused to travel through the full length of its swing, and until it has accomplished its intended functions,—we provide a toothed, arcuate plate 231, fixed to the end frame 83 adjacent to the path of the lever, with its center coincident with the fulcrum 173 of the lever. A spring controlled pivotal pawl 232 is carried by the lever and is adapted for engagement with the teeth of said plate. Said pawl is radially disposed as to the arcuate plate 231 and is controlled by a spring 233, which yieldingly holds it in radial position. The toothed plate is cut away in line with the teeth at 234, 235, corresponding to the positions of the lever at the opposite limits of its movement, so that the pawl 232 cannot engage the plate when the lever is in either of said positions. When the lever is intermediate said positions, the pawl will engage the teeth of the plate 231 and lock the lever against movement in a direction opposite to that in which it started, in a familiar manner.

We claim as our invention:

1. In a cash register, in combination with a casing, a cash drawer, means for locking the same in said casing, a platen over which a record strip, transfer means and check-strip are adapted to be fed, a cover plate provided with laterally spaced openings, one to expose the check-strip and one to expose the record-strip, normally locked means for partially feeding said check-strip, normally locked means for releasing said cash drawer and for feeding said record-strip, a depressible part included in said platen located below the opening which exposes said record strip, means operated by said depressible platen part for unlocking said check-strip partial feeding means, and means actuated by the check-strip when completely withdrawing it for unlocking the cash drawer releasing and record-strip feeding means.

2. In a cash register, in combination with a casing, a cash drawer, means for locking the same in said casing, a platen over which a record-strip, transfer means and a check-strip are adapted to be fed, a cover plate provided with laterally spaced openings, one to expose the check-strip and one to expose the record-strip, normally locked means for partially feeding said check-strip, normally locked means for releasing said cash drawer, a depressible part included in said platen located below the opening which exposes said record-strip, means operated by said depressible platen part for unlocking said check-strip partial feeding means, and means actuated by the check-strip when completely withdrawing it for unlocking the cash drawer releasing means.

3. In a cash register, in combination with a casing, a platen over which a record-strip, transfer means and a check-strip are adapted to be fed, a cover plate provided with laterally spaced openings, one to expose the check-strip and one to expose the record-strip, normally locked means for partially feeding said check-strip, normally locked means for feeding said record-strip, a depressible part included in said platen located below the opening which exposes said record-strip, means operated by said depressible platen part for unlocking said check-strip partial feeding means, and means actuated by the check-strip when completely withdrawing it for unlocking said record-strip feeding means.

4. In a cash register, having a cash drawer and means for locking the cash drawer in closed position, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for releasing the cash drawer and for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever and means operable by said check strip when it is withdrawn a full check length for releasing said auxiliary trigger.

5. In a cash register, having a cash drawer and means for locking the cash drawer in closed position, a platen over which a record-strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for releasing the cash drawer and for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever, means operable by said check strip when it is withdrawn a full check length for releasing said auxiliary trigger and means for resetting said trigger members.

6. In a cash register, having a cash drawer and means for locking the cash drawer in closed position, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for releasing the cash drawer and for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever, means operable by said check strip when it is withdrawn a full check length for releasing said auxiliary trigger and means actuated by said lever for resetting said trigger members.

7. In a cash register, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever and means operable by said check strip when it is withdrawn a full check length for releasing said auxiliary trigger.

8. In a cash register, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever, means operable by said check strip when it is withdrawn a full check length for releasing said auxiliary trigger and means for resetting said trigger members.

9. In a cash register, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever, means operable by said check strip when it is withdrawn a full check length for releasing said auxiliary trigger and means actuated by said lever for resetting said trigger members.

10. In a cash register, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever and means operable by said check strip when it is withdrawn a full check length for releasing said auxiliary trigger.

11. In a cash register, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever, means operable by said check strip when it is withdrawn a full check length for releasing said auxiliary trigger and means for resetting said trigger members.

12. In a cash register, a platen over which a record strip, a transfer strip and a check strip are adapted to be fed, a cover plate provided with laterally spaced openings, one to expose the check strip and one to expose a part of the record strip, a device for partially feeding the check strip, a slide normally locking said check strip feeding device against movement, a lever for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said lever, means operable by said check strip when it is withdrawn a full check length for releasing said auxiliary trigger and means actuated by said lever for resetting said trigger member.

13. In a cash register, having a cash drawer and means for locking the cash drawer in closed position, a platen over which a record strip, transfer strips and a plurality of check strips are adapted to be fed, a cover plate provided with laterally spaced openings, one to expose each check strip and one to expose the record strip, devices for partially feeding the several check strips, a slide normally locking said devices against movement, a primary operating member for releasing the cash drawer and for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said prime mover, and means operable by each check strip when it is withdrawn a full check length for releasing said auxiliary trigger.

14. In a cash register, having a cash drawer and means for locking the cash drawer in closed position, a platen over which a record strip, transfer strips and a plurality of check strips are adapted to be fed, a cover plate provided with laterally spaced openings, one to expose each check strip and one to expose the record strip, devices for partially feeding the several check strips, a slide normally locking said devices against movement, a primary operating member for releasing the cash drawer and for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said prime mover, means operable by each check strip when it is withdrawn a full check length for releasing said auxiliary trigger and means for resetting said trigger member.

15. In a cash register, having a cash drawer and means for locking the cash drawer in closed position, a platen over which a record strip, transfer strips and a plurality of check strips are adapted to be fed, a cover plate provided with laterally spaced openings, one to expose each check strip and one to expose the record strip, devices for partially feeding the several check strips, a slide normally locking said devices against movement, a primary operating member for releasing the cash drawer and for feeding the record strip, a depressible part included in said platen located below the opening which exposes said record strip, a trigger member normally locked by said depressible platen part adapted to prevent the movement of said slide, a spring controlled auxiliary trigger member adapted to normally prevent the operation of said prime mover, means operable by each check strip when it is withdrawn a full check length for releasing said auxiliary trigger and means actuated by said lever for resetting said trigger member.

16. In a cash register, in combination with a casing, a cash drawer, means for locking the same in said casing, a platen over which a plurality of record strips, transfer means and laterally spaced check strips are adapted to be fed, a cover plate provided with a plurality of laterally spaced openings to expose said check strips and a part of each of said record strips, normally locked means associated with each check strip for partially feeding the same beyond one edge of said cover plate, normally locked means for releasing said cash drawer and for feeding said record strips independently of each other, a spring controlled depressible part included in said platen located below the opening which exposes one of said record strips, means operated by said depressible platen part for unlocking said several check strip feeding means, and means actuated by each of said check strip feeding means for unlocking said cash drawer releasing means and one of said record strip feeding means.

17. In a cash register, in combination with a platen over which a plurality of record strips, transfer means and laterally spaced check strips are adapted to be fed, there being one record strip associated with one of said check strips and the other record strip being associated with the remainder of said check strips, a cover plate provided with laterally spaced openings to expose said check strips and a part of each of said record-strips, means for feeding said check strips beyond said cover plate, a main operating lever, said lever being adapted for feeding each of said record strips independently of one another, and means actuated by said check strip feeding means for operatively connecting the associated record strip feeding means with said operating lever.

18. In a cash register, in combination with a platen over which a plurality of record strips, transfer means and laterally spaced check strips are adapted to be fed, there being one record strip associated with one of said check strips and the remainder of said record strips being associated with the remainder of said check strips, a cover plate provided with laterally spaced openings to expose said check strips and a part of each of said record strips, means for feeding said check strips beyond said cover plate, a main operating lever, said lever being adapted for feeding each of said record strips independently of one another and means actuated by said check strip feeding means for operatively connecting the associated record strip feeding means with said operating lever and for rendering ineffective the feeding means of the remainder of said record strips.

19. In a cash register, in combination with a platen over which two record-strips, a plurality of transfer means and laterally spaced check strips are adapted to be fed, there being one record strip associated with one of said check strips and the other of said record strips being associated with the remainder of said check strips, a cover plate provided with laterally spaced openings to expose said check strips and a part of each of said record strips, means for feeding each of the check strips beyond said cover plate, a main operating lever, said lever being adapted for feeding either of said record strips independently of the other, and means actuated by one of said check strip feeding means for operatively connecting the feeding means of the associated record strip with said operating lever and for rendering ineffective the feeding means of the other record strip.

20. In a cash register, in combination with a platen over which two record strips, a plurality of transfer means and laterally spaced check strips are adapted to be fed, there being one record strip associated with one of said check strips and the other of said record strips being associated with the remainder of said check strips, a cover plate provided with laterally spaced openings to expose said check strips and a part of each of said record strips, means for feeding said check strips beyond said cover plate, a main operating lever, said lever being adapted for feeding either of said record strips independently of the other, and means actuated by one of the check strip feeding means for operatively connecting the feeding means of the associated record strip with said operating lever.

21. In a cash register, in combination with a platen over which a plurality of record strips, transfer means and laterally spaced check strips are adapted to be fed, there being one record strip associated with one of said check strips and the remainder of said record strips being associated with the remainder of said check strips, a cover plate provided with laterally spaced openings to expose said check strips and a part of each of said record strips, means for feeding said check strips beyond said cover plate, a main operating lever, said lever being adapted for feeding each of said record strips independently of one another, means actuated by said check strip feeding means for operatively connecting the associated record strip feeding means with said operating lever, and means intermediate said lever and associated record strip feeding means for actuating said record strip feeding means and for rendering ineffective the feeding of the remainder of said record strip feeding means.

22. In a cash register, in combination with a platen over which two record strips, a plurality of transfer means and laterally spaced check strips are adapted to be fed, there being one record strip associated with one of said check strips and the other of said record strips being associated with the remainder of said check strips, a cover plate provided with laterally spaced openings to expose said check strips and a part of each of said record strips, means for feeding one of said check strips beyond said cover plate, a main operating lever, said lever being adapted for feeding one of said record strips independently of the other, means actuated by one of said check strip feeding means for operatively connecting the associated record strip feeding means with said operating lever, and means intermediate said lever and associated check strip feeding means for actuating said record strip feeding means and for rendering ineffective the feeding of the other of said record strip feeding means.

23. In a cash register, in combination with a platen over which two record strips, a plurality of transfer means and laterally spaced check strips are adapted to be fed, there being one record strip associated with one of said check strips and the other of said record strips being associated with the remainder of said check strips, a cover plate provided with laterally spaced openings to expose said check strips and a part of each of said record strips, means for feeding said check strips beyond said cover plate, a main operating lever, said lever being adapted for feeding one of said record strips independently of the other, means actuated by one of said check strip feeding means for operatively connecting the associated record strip feeding means with said operating lever, means intermediate said lever and associated record strip feeding means for actuating said record strip feeding means on the forward movement of said lever at the same time rendering ineffective the feeding means of the other record strip feeding means, and means actuated upon the return movement of said lever for returning both of said record strip feeding means to their normal positions.

24. In a cash register, in combination with a casing, a cash drawer, means for locking the same in said casing, a platen over which a plurality of record strips, transfer means and a plurality of laterally spaced check strips are adapted to be fed, a cover plate provided with a plurality of laterally spaced openings to expose said check strips, and a part of each of said record strips, normally locked means associated with each check strip for partially feeding the same beyond one edge of said cover plate, normally locked means for releasing said cash drawer and for feeding either of said record strips, spring controlled depressible parts included in said platen located below the openings which expose said strips, means operated by said depressible platen part for unlocking said several check strip feeding means, and means actuated by each of said check strip feeding means for unlocking said cash drawer releasing means and either of said record strip feeding means.

25. In a cash register, in combination with a casing, a cash drawer, means for locking the same in said casing, a platen over which a plurality of record strips, transfer means and a plurality of laterally spaced check strips are adapted to be fed, a cover plate provided with a plurality of laterally spaced openings to expose said check strips, and a part of each of said record strips, normally locked means associated with each check strip for partially feeding the same beyond one edge of said cover plate, normally locked means for releasing said cash drawer and for feeding either of said record strips, spring controlled depressible parts included in said platen located below the openings which expose said record strips, there being one depressible part associated with each record strip, and means actuated by any of said check strip feeding means for unlocking said cash drawer releasing means and one of said record strip feeding means.

26. In a cash register, in combination with a casing, a cash drawer, means for locking the same in said casing, a platen over which a plurality of record strips, transfer means and a plurality of laterally spaced check strips are adapted to be fed, a cover plate provided with a plurality of laterally spaced openings to expose said check strips, and a part of each of said record strips, normally locked means associated with each check strip for partially feeding the same beyond one edge of said cover plate, normally locked means for releasing said cash drawer and for feeding either of said record strips, interacting spring controlled depressible parts included in said platen located below the openings which exposes said record strip, there being one depressible part associated with each record strip, and means actuated by any of said check strip feeding means for unlocking said cash drawer releasing means and one of said record strip feeding means.

27. In a cash register, in combination with a casing, a cash drawer, means for locking the same in said casing, a platen over which a plurality of record strips, transfer means and a plurality of laterally spaced check strips are adapted to be fed, one of said check strips being associated with one of said record strips and the remainder of said check strips being associated with the remainder of said record strips, a cover plate provided with a plurality of laterally spaced openings to expose said check strips, and a part of each of said record strips, normally locked means associated with each check strip for partially feeding the same beyond one edge of the cover plate, normally locked means for releasing said cash drawer and for feeding said record strips independently of each other, spring controlled depressible parts included in said platen located below the openings which expose said record strips, means operated by either of said depressible platen parts for unlocking said several check strip feeding means, and means actuated by one of said check feeding means for unlocking said cash drawer releasing means and the releasing means of the associated record strip feeding means.

28. In a cash register, in combination with a casing, a cash drawer, means for locking the same in said casing, a platen over which two record strips, a plurality of transfer means, and laterally spaced check strips are adapted to be fed, a cover plate provided with a plurality of laterally spaced openings to expose said check strip and a part of each of said record strips, normally locked means associated with each check strip for partially feeding the same beyond one edge of the cover plate, normally locked means for releasing said cash drawer and for feeding one of said record strips independently of the other record strip, spring controlled depressible parts included in said platen there being one located below each record strip and associated exposing openings, means operated by either of said depressible platen parts for unlocking the several check strip feeding means, and means actuated by one of said check strip feeding means partially unlocking said cash drawer releasing means and the releasing means of the associated record strip feeding means.

29. In a cash register, in combination with a casing, a cash drawer, means for locking the same in said casing, a platen over which two record strips, a plurality of transfer means, and laterally spaced check strips are adapted to be fed, a cover plate provided with a plurality of laterally spaced openings to expose said check strip and a part of each of said record strips, normally locked means associated with each check strip for partially feeding the same beyond one edge of the cover plate, normally locked means for releasing said cash drawer and for feeding one of said record strips independently of the other record strip, spring controlled depressible parts included in said platen, there being one located below each record strip and associated exposing opening, means operated by either of said depressible platen parts for unlocking the several check strip feeding means, and means actuated by one of said check strip feeding means partially unlocking said cash drawer releasing means and the releasing means of the associated record strip feeding means, and means for finally unlocking said cash drawer releasing and record strip operating means.

30. In a cash register, in combination with a casing, a cash drawer, means for locking the same in said casing, a platen over which two record strips, a plurality of transfer strips, and laterally spaced check strips are adapted to be fed, a cover plate provided with a plurality of laterally spaced openings to expose said check strip and a part of each of said record strips, normally locked means associated with each check strip for partially feeding the same beyond one edge of the cover plate, normally locked means for releasing said cash drawer and for feeding one of said record strips independently of the other record strips, spring controlled depressible parts included in said platen there being one located below each record strip and associated exposing opening, means operated by either of said depressible platen parts for unlocking the several check strip feeding means, and means actuated by one of said check strip feeding means partially unlocking said cash drawer releasing means and the releasing means for the associated record strip feeding means, and means finally unlocking said cash drawer releasing and record strip operating means, said last mentioned means being actuated upon the final feed of the check strip.

31. In a cash register, in combination with a casing, a cash drawer, means for locking the same in said casing, a platen over which a record strip, transfer means and a check strip are adapted to be fed, a cover plate provided with laterally spaced openings, one to expose the check strip and one to expose the record strip, normally locked means for partially feeding said check strip beyond one edge of said cover plate, a main operating lever, a main and auxiliary means for locking said lever, mechanism actuated by said lever for releasing said cash drawer and mechanism actuated thereby for feeding said record strip, a spring controlled depressible part included in said platen located below the opening which exposes said record strip, means operated by said depressible platen part for unlocking said check strip feeding means, and means actuated by the check strip feeding means for unlocking the main locking means of the main operating lever, and means for unlocking the auxiliary locking means thereof.

32. In a cash register, in combination with a casing, a cash drawer, means for locking the same in said casing, a platen over which a record strip, transfer means and a check strip are adapted to be fed, a cover plate provided with laterally spaced openings, one to expose the check strip and one to expose the record strip, normally locked means for partially feeding said check strip beyond one edge of said cover plate, a main operating lever, a main and auxiliary means for locking said lever, mechanism actuated by said lever for releasing said cash drawer and mechanism actuated thereby for feeding said record strip, a spring controlled depressible part included in said platen located below the opening which exposes said record strip, means actuated by said depressible platen part for unlocking said check strip feeding means, and means actuated by the check strip feeding means for unlocking the main locking means of the main operating lever, and means for unlocking the auxiliary locking means thereof, said last mentioned means being actuated upon final feed of the check strip feeding means.

33. In a cash register, in combination with a casing, a cash drawer, means for locking the same in said casing, a platen over which a plurality of record strips, transfer means and check strips are adapted to be fed, a cover plate provided with laterally spaced openings, one to expose each check strip and one to expose each record strip, normally locked means for partially feeding said check strip beyond one edge of said cover plate, a main operating lever, a main and auxiliary means for locking said lever, mechanism actuated by said lever releasing said cash drawer and for feeding one of said record strips independently of the other, spring controlled depressible parts included in said platen located below the openings which expose the record strips, means operated by either of said depressible platen parts for unlocking said check strip feeding means, means actuated by said check strip feeding means for unlocking the main locking means of the operating lever, and means for unlocking the auxiliary locking means thereof.

34. In a cash register, in combination with a casing, a cash drawer, means for locking the same in said casing, a platen over which a plurality of record strips, transfer means and check strips are adapted to be fed, a cover plate provided with laterally spaced openings, one to expose each check strip and one to expose each record strip, normally locked means for partially feeding said check strip beyond the edge of said cover plate, a main operating lever, a main and auxiliary means for locking said lever, mechanism actuated by said lever releasing said cash drawer and for feeding one of said record strips independently of the other, spring controlled depressible parts included in said platen located below the openings which expose the record strips, means operated by either of said depressible platen parts for unlocking said check strip feeding means, means actuated by the said check strip feeding means for unlocking the main locking means of the operating lever, and means actuated by the further feed of said check strip feeding means for releasing the auxiliary locking means of said lever.

35. In a cash register, in combination with a casing, a cash drawer, means for locking the same in said casing, a platen over which a record-strip, transfer means and a plurality of laterally spaced check-strips are adapted to be fed, a cover plate provided with laterally spaced openings to expose said check-strips and a part of said record-strip, normally locked means for feeding said check-strips beyond said cover-plate, a main operating lever, mechanism actuated by said lever for feeding said record-strip, triggers normally locking said main lever against movement, said triggers also constituting means for locking said check-strip feeding means, one of said triggers being capable of an initial and of a final movement, a depressible part included in said platen located below the opening which exposes said record-strip, said depressible platen part normally locking one of said triggers against initial movement, said trigger when released by said depressible platen part in its initial movement releasing said check-strip feeding means, without releasing said main operating lever, and means actuated by said check strip feeding means to produce the final movement of said triggers to release said lever.

36. In a cash register, in combination with a casing, a cash drawer, means for locking the same in said casing, a platen over which a record-strip, transfer means and a plurality of laterally spaced check-strips are adapted to be fed, a cover plate provided with laterally spaced openings to expose said check-strips and a part of said record-strip, normally locked means for feeding said check-strips beyond said cover plate, a main operating lever, mechanism actuated by said lever for releasing said cash-drawer, mechanism actuated by said lever for feeding said record-strip, a main and auxiliary trigger normally locking said main lever against movement, said main trigger also constituting means for locking said check-strip feeding means, and also being capable of an initial and of a final movement, a depressible part included in said platen located below the opening which exposes said record-strip, said depressible part normally locking said main trigger against initial movement, said trigger when released by said depressible platen part in its initial movement releasing said check-strip feeding means, without releasing said main operating lever and means actuated by said check-strip feeding means to produce the final movement of said main and auxiliary triggers to release said lever.

37. In a cash register, in combination with a casing, a cash drawer, means for locking the same in said casing, a platen over which a plurality of record strips, transfer means and laterally spaced check-strips are adapted to be fed, a cover plate provided with laterally spaced openings to expose said check-strips and a part of said record-strips, normally locked means for feeding said check-strips beyond said cover plate, a main operating lever, mechanism actuated by said lever for releasing said cash-drawer, mechanism actuated by said lever for feeding any one of said record strips, triggers normally locking said main lever against movement, said triggers also constituting means for locking said check-strip feeding means, one of said triggers being capable of an initial and of a final movement, depressible parts included in said platen located below the openings which expose said record-strips, there being one depressible part associated with each record-strip, said depressible parts normally locking one of said triggers against initial movement, said trigger when released by any one of said depressible platen parts in its initial movement releasing said check-strip feeding means, without releasing said main operating lever and means actuated by said check-strip feeding means to produce the final movement of said triggers to release said lever.

38. In a cash register, in combination with a casing, a cash drawer, means for locking the same in said casing, a platen over which a plurality of record-strips, transfer means and laterally spaced check strips are adapted to be fed, a cover plate provided with laterally spaced openings to expose said check strips and a part of said record strips, normally locked means for feeding said check strips beyond said cover plate, a main operating lever, mechanism actuated by said lever for releasing said cash-drawer, mechanism actuated by said lever for feeding any one of said record strips, a main and auxiliary trigger normally locking said main lever against movement, said main trigger also constituting means for locking said check strip feeding means, and also being capable of an initial and of a final movement, depressible parts included in said platen located below the openings which expose said record strips, there being one of said depressible parts associated with each record strip, said depressible parts normally locking said main trigger against initial movement, said trigger when released by any one of said depressible platen parts in its initial movement releasing said check strip feeding means, without releasing said main operating lever and means actuated by said check strip feeding means to produce the final movement of said main and auxiliary triggers to release said lever.

39. In a cash register, in combination with a casing, a cash drawer, means for locking the same in the casing, a platen over which two record strips, transfer means and a plurality of check strips are adapted to be fed, a cover plate provided with laterally spaced openings to expose said check strips and a part of each record strip, normally locked means for feeding said check strips beyond said cover plate, a main operating lever, mechanism actuated thereby for releasing said cash drawer, mechanism actuated by said lever for feeding both of said record strips, a main and auxiliary trigger normally locking said main lever against movement, said main trigger also constituting means for locking said check strip feeding means, the main trigger being capable of an initial and final movement, depressible parts included in said platen, located below each opening which exposes said record strips, there being one depressible part associated with each record strip, said depressible parts normally locking the main trigger against initial movement, said main trigger when released by either of said depressible platen parts in its initial movement releasing said check strip feeding means without releasing said main operating lever, and means actuated by said check strip feeding means to produce the final movement of said main and auxiliary triggers to release said lever.

40. In a cash register, in combination with a casing, a cash drawer, means for locking the same in said casing, a platen over which two record strips, transfer means and a plurality of check strips are adapted to be fed, a cover plate provided with laterally spaced openings to expose said check strips and a part of each record strip, normally locked means for feeding said check strips beyond said cover plate, a main operating lever, mechanism actuated thereby for releasing said cash drawer, mechanism actuated by said lever for feeding either of said record strips, independently of each other, a main and an auxiliary trigger normally locking said main lever against movement, said main trigger also constituting means for locking said check strip feeding means, the main trigger being capable of an initial and final movement, depressible parts included in said platen, located below each opening which exposes said record strips, there being one depressible part associated with each record strip, said depressible parts normally locking the main trigger against initial movement, said main trigger when released by either of said depressible platen parts, in its initial movement releasing said check strip feeding means without releasing said main operating lever and means actuated by said check strip feeding means to produce the final movement of said main and auxiliary triggers to release said lever.

41. In a cash register, in combination with a casing, a cash drawer, means for locking the same in said casing, a platen over which a record strip, transfer means and a plurality of laterally spaced check strips are adapted to be fed, a cover plate provided with laterally spaced openings to expose said check strips and a part of said record strip, means for feeding said check strips beyond said cover plate, a main operating lever for releasing said cash-drawer and for feeding said record strip, triggers, one of which is capable of an initial and of a final movement, said triggers acting to lock said main operating lever against movement, a movable member normally acting to lock said several check strip feeding means against movement, said member being held against movement until one of said triggers has had its initial movement, a spring-controlled depressible part included in said platen located below the opening which exposes said record strip, said depressible platen part normally locking the one trigger against initial movement, and said movable member which acts to lock said check strip feeding means, until said trigger has been given its initial movement, acting to produce the final movement of the one of said triggers to release said main operating lever when any one of the check strip feeding means is actuated, and means for actuating the other trigger to release said main operating lever.

42. In a cash register, in combination with a casing, a cash drawer, means for locking the same in said casing, a platen over which a plurality of record strips, transfer means and a plurality of laterally spaced check strips are adapted to be fed, a cover-plate provided with laterally spaced openings to expose said check-strips and a part of said record-strips, means for feeding said check-strips beyond said cover plate, a main operating lever for releasing said cash-drawer and for feeding said record-strips, triggers, one of which is capable of an initial and of a final movement, said triggers acting to lock said main operating lever against movement, a movable member normally acting to lock said several check strip feeding means against movement, said member being held against movement until one of said triggers has had its initial movement, spring controlled depressible parts included in said platen located below the opening which exposes said record strip, there being one of said depressible platen parts associated with each record-strip, said depressible platen parts normally locking the one trigger against initial movement, and said movable member which acts to lock said check strip feeding means until said trigger has been given its initial movement, acting to produce the final movement of the one of said triggers to release said main operating lever when any one of the check strip feeding means is actuated, and means actuated upon the final feed of any of the check strip feeding means for imparting final movement to the other trigger to release said operating lever.

43. In a cash register, in combination with a casing, a cash drawer, means for locking the same in said casing, a platen over which a plurality of record strips, transfer means and laterally spaced check strips are adapted to be fed, a cover-plate provided with laterally spaced openings to expose said check strips and a part of said record strips, means for feeding said check strips beyond said cover plate, a main operating lever for releasing said cash drawer and for feeding said record strips, triggers, one of which is capable of an initial and of a final movement, said triggers acting to lock said main operating lever against movement, a movable member normally acting to lock said several check strip feeding means against movement, said member being held against movement until one of said triggers has had its initial movement, spring controlled depressible parts included in said platen located below the openings which expose said record strip, there being one of said depressible platen parts normally locking the one trigger against initial movement, and said movable member which acts to lock said check strip feeding means, until said trigger has been given its initial movement, acting to produce the final movement of the one of said triggers to release said main operating lever when any one of the check strip feeding means is actuated, and means for actuating the other trigger to release said main operating lever.

44. In a cash register, in combination with a casing, a cash drawer, means for locking the same in said casing, a platen over which two record strips, transfer means and a plurality of laterally spaced check strips are adapted to be fed, a cover-plate provided with laterally spaced openings to expose said check strips and a part of each of said record strips, means for feeding said check strips beyond said cover plate, a main operating lever for releasing said cash drawer and for feeding each of said record strips, independently of one another, a main and an auxiliary trigger, said main trigger being capable of an initial and of a final movement, said triggers acting to lock said main operating lever against movement, a movable member normally acting to lock said several check strip feeding means against movement, said member being held against movement until the said main trigger has had its initial movement, spring controlled depressible parts included in said platen located below the openings which exposes said record strips, there being one of said depressible parts associated with each record strip, said depressible platen parts normally locking the main trigger against initial movement, and said movable member which acts to lock said check strip feeding means, until said main trigger has been given its initial movement, acting to produce the final movement of said main trigger to release said main operating lever when any one of the check strip feeding means is actuated, and means for actuating the other trigger to fully release said main operating lever.

45. In a cash register, in combination with a casing, a cash drawer, means for locking the same in said casing, a platen over which a plurality of record strips, transfer means and laterally spaced check strips are adapted to be fed, a cover plate provided with laterally spaced openings to expose said check strips and a part of said record strips, means for feeding said check strips beyond said cover plate, a main operating lever for releasing said cash drawer and for feeding said record strips, triggers, one of which is capable of an initial and of a final movement, said triggers acting to lock said main operating lever against movement until after given their final movement, a movable member normally acting to lock said several check strip feeding means against movement, said member being held against movement until one of said triggers has had its initial movement, spring controlled depressible parts included in said platen located below the opening which exposes said record strip, there being one of said depressible platen parts associated with each record strip, said depressible platen parts normally locking the one trigger against initial movement, and said movable member which acts to lock said check strip feeding means until said trigger has been given its initial movement, acting to produce the final movement of the one of said triggers to release said main operating lever when any one of the check strip feeding means is actuated, and means actuated upon the final feed of any of the check strip feeding means for imparting final movement to the other trigger to release said operating lever.

46. In a cash register, in combination with a casing, a cash drawer, means for locking the same in said casing, a platen over which two record strips, transfer means and a plurality of laterally spaced check strips are adapted to be fed, a cover plate provided with laterally spaced openings to expose said check strips and a part of each of said record strips, means for feeding said check strips beyond said cover plate, a main operating lever for releasing said cash drawer and feeding each of said record strips, independently of one another, a main and auxiliary trigger, said main trigger being capable of an initial and of a final movement, a movable member normally acting to lock said several check strip feeding means against movement, said member being held against movement until the said main trigger has had its initial movement, spring-controlled depressible parts included in said platen located below the openings which expose said record strips, there being one of said depressible platen parts associated with each record strip, said depressible platen parts normally locking the main trigger against initial movement, and said movable member which acts to lock said check strip feeding means until said trigger has been given its initial movement, acting to produce the final movement of said main trigger to release said main operating lever when any one of the check strip feeding means is actuated, and means actuated upon the final feed of any of the check strip feeding means for imparting final movement to the other trigger to fully release said operating lever.

47. In a cash register, in combination with a casing, a cash drawer, means for locking the same in said casing, a platen over which a plurality of record strips, transfer means and check strips are adapted to be fed, there being one check strip associated with one record strip, the remainder of said check strips being associated with the remainder of said record strips, a cover plate provided with laterally spaced openings, one to expose each check strip and one to expose a part of each record strip, normally locked means for partially feeding said check strip beyond said cover plate, normally locked means for releasing said cash drawer, depressible parts included in said platen located below the opening which exposes said record strips, means operated by either of said depressible platen parts for unlocking said check strip feeding means, and means actuated by said check strip feeding means for unlocking said cash drawer releasing means.

48. In a cash register, in combination with a casing, a cash drawer, means for locking the same in said casing, a platen over which two record strips, transfer means and a plurality of laterally spaced check strips are adapted to be fed, there being one check strip associated with one of said record-strips and the remainder of said check strips being associated with the other record strips, a cover plate provided with a plurality of laterally spaced openings, one to expose each check strip and one to expose a part of each of said record strips, normally locked means associated with each check-strip for partially feeding the same beyond said cover-plate, normally locked means for releasing said cash drawer, depressible parts included in said platen located below the openings which expose said record strips there being one depressible platen part associated with each record strip, means operated by either one of said depressible platen parts for unlocking said several check strip feeding means, and means actuated by each of said check strip feeding means for unlocking said cash drawer releasing means.

49. In a cash register, in combination with a platen, over which a record strip and a plurality of laterally spaced checks strips together with transfer means are adapted to be fed, a cover plate provided with openings to expose said check strips and a part of said record strip, devices associated with each check strip for partially feeding the same, a spring controlled movable bar normally locking said check-strip feeding devices against movement, means interposed between said check strip feeding device and said bar for moving said bar when it is released, a main and auxiliary trigger acting to lock said main operating lever, said main trigger being capable of an initial and final movement, and acting to lock said main operating lever until it has been moved into unlocking position, said main trigger also locking said movable bar until it has been initially moved, a spring controlled depressible platen part included in said platen, said platen part acting to lock said main trigger against initial movement until depressed, said bar when moved by said check-strip feeding device acting to produce the final movement of said main trigger in its release of the main operating lever, and means actuating the auxiliary trigger to move it out of locking engagement with said main lever.

50. In a cash register, in combination with a platen over which a record strip and a plurality of laterally spaced check strips together with transfer means are adapted to be fed, a cover plate provided with openings to expose said check strips and a part of said record strip, devices associated with each check strip for partially feeding the same, a spring controlled movable bar normally locking said check-strip feeding devices against movement, means interposed between said check strip feeding device and said bar for moving said bar when it is released, a main and auxiliary trigger acting to lock said main operating lever, said main trigger being capable of an initial and final movement, and acting to lock said main operating lever until it has been moved into unlocking position, said main trigger locking said bar until said main trigger is initially moved, a spring controlled depressible platen part included in said platen which acts to lock said main trigger against initial movement until depressed, said bar when moved by said check strip feeding device acting to produce the final movement of said main trigger in its release of the main operating lever and means actuated upon final feed of the check strip for moving said auxiliary trigger out of locking engagement with said main lever.

51. In a cash register, in combination with a platen over which two record strips and a plurality of laterally spaced check strips together with transfer means are adapted to be fed, a cover plate provided with openings to expose said check strips and part of each of said record-strips, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger being capable of an initial and final movement, said triggers acting to lock said main operating lever until they have moved into unlocking position, the said main trigger locking said bar until said main trigger is initially moved, spring controlled depressible platen parts one associated with each record-strip included in said platen, said platen parts acting to lock said main trigger against initial movement until one of them is depressed, said bar when moved by said check strip feeding device acting to produce the final movement of said trigger in its release of the main operating lever, and means actuating the auxiliary trigger to move it out of locking engagement with said main lever.

52. In a cash register, in combination with a platen, over which two record strips and a plurality of laterally spaced check strips together with transfer means are adapted to be fed, a cover plate provided with openings to expose said check strips and a part of each of said record strips, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger being capable of an initial and final movement, said triggers acting to lock said main operating lever until they have moved into unlocking position, the said main trigger locking said bar until said main trigger is initially moved, spring controlled depressible platen parts, one associated with each record strip, in said platen, said platen parts acting to lock said main trigger against initial movement until one of them is depressed, said bar when moved by said check strip feeding device acting to produce the final movement of said main trigger in its release of the main operating lever, and means actuated upon further feed of said check strip for moving said trigger out of locking engagement with said main lever.

53. In a cash register, in combination with a platen apertured at its ends over which two record strips, transfer means and a plurality of laterally spaced check strips are adapted to be fed, said record strips being adapted to cover said platen apertures, a cover plate provided with laterally spaced openings to expose said check strips and a part of each of said record strips, means for feeding said check strips beyond said cover plate, a main operating lever for releasing said cash drawer and for feeding each of said record strips independently of each other, a main and auxiliary trigger, said main trigger being capable of an initial and of a final movement, said triggers acting to lock said main operating lever against movement until after given their final movement, a movable member normally acting to lock said several check strip feeding means against movement, said member being held against movement until the said main trigger has accomplished its initial movement, a spring controlled depressible part located in each aperture of said platen and below the openings which expose said record strip, said depressible platen parts comprising interacting plates pivoted to said platen, there being one of said depressible platen parts associated with each record strip, one of said depressible platen parts normally locking the main trigger against initial movement, and said movable member which acts to lock said check-strip feeding means until said trigger has been given its initial movement, acting to produce the final movement of said main trigger to release said main operating lever when any one of the check strip feeding means is actuated, and means actuated upon the final feed of any of the check strip feeding means for imparting final movement to the other trigger to fully release said operating lever.

54. In a cash register, in combination with a platen over which a record strip and a plurality of laterally spaced check strips together with transfer means are adapted to be fed, a cover plate provided with openings to expose said check strips and a part of said record strip, devices associated with each check strip for partially feeding the same, a spring controlled movable bar normally locking said check strip feeding devices against movement, means interposed between said check strip feeding devices and said bar for moving said bar when it is released, a main and auxiliary trigger acting to lock said main operating lever, said main trigger being capable of an initial and final movement, said trigger acting to lock said main operating lever until it has been moved into unlocking position, said main trigger locking said bar until said main trigger is initially moved, a spring controlled depressible part included in said platen which acts to lock said main trigger against initial movement until depressed, said bar when moved by said check strip feeding device acting to produce the final movement of said main trigger in its release of the main operating lever, and means actuating the auxiliary trigger to move it out of locking engagement with said main lever, one of said triggers having a part adapted to be struck in the operation of said main lever to return said trigger to its normal position.

55. In a cash register, in combination with a platen over which a record strip and a plurality of laterally spaced check strips together with transfer means are adapted to be fed, a cover plate provided with openings to expose said check strips and a part of said record strip, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger being capable of an initial and final movement, said trigger acting to lock said main operating lever until it has been moved into unlocking position, said main trigger locking said bar until said main trigger is initially moved, a spring controlled depressible platen part included in said platen which acts to lock said main trigger against initial movement until depressed, said bar when moved by said check strip feeding device acting to produce the final movement of said main trigger in its release of the main operating lever, and means actuating the auxiliary trigger to move it out of locking engagement with said main lever, said main trigger having a part adapted to be struck in the operation of said main lever to return said main trigger in locking engagement with the depressible platen part.

56. In a cash register, in combination with a platen over which two record strips and a plurality of laterally spaced check strips together with transfer means are adapted to be fed, a cover plate provided with openings to expose said check strips and a part of each of said record strips, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger being capable of an initial and final movement, said triggers acting to lock said main operating lever until they have moved into unlocking position, the said main trigger locking said bar until said main trigger is initially moved, spring controlled depressible platen parts, one associated with each record strip included in said platen, said platen parts acting to lock said main trigger against initial movement until one of them is depressed, said bar when moved by said check strip feeding device acting to produce the final movement of said main trigger in its release of the main operating lever, and means actuating the auxiliary trigger to move it out of locking engagement with said main lever, one of said triggers having a part adapted to be struck in the operation of said main lever to return said trigger to its normal locked position.

57. In a cash register, in combination with a platen over which two record-strips and a plurality of laterally spaced check strips together with transfer means are adapted to be fed, a cover plate provided with openings to expose said check strips and a part of each of said record-strips, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger being capable of an initial and final movement, said triggers acting to lock said main operating lever until they have moved into unlocking position, the said main trigger locking said bar until said main trigger is initially moved, spring controlled depressible platen parts, one associated with each record strip included in said platen, said platen parts acting to lock said main trigger against initial movement until one of them is depressed, said bar when moved by said check strip feeding device acting to produce the final movement of said main trigger in its release of the main operating lever, and means actuating the auxiliary trigger to move it out of locking engagement with said main lever, the main trigger having a part adapted to be struck in the operation of said main lever to return said trigger to its locked position relative to its associated platen parts.

58. In a cash register, in combination with a casing, a cash drawer, means for locking the same in said casing, a platen, over which two record strips and a plurality of laterally spaced check strips together with transfer means are adapted to be fed, a cover plate provided with openings to expose said check strips and a part of each of said record strips, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger having a tooth at one end and being capable of an initial and final movement, said triggers acting to lock said main operating lever until they have moved into unlocking position, the said main trigger locking said bar until said main trigger is initially moved, spring controlled depressible platen parts, one associated with each record strip included in said platen and one of said platen parts having a depending pawl normally engaged with the tooth on the main trigger to lock said main trigger against initial movement until one of them is depressed, said bar when moved by said check strip feeding device acting to produce the final movement of said main trigger in its release of the main operating lever and means actuating the auxiliary trigger to move it out of locking engagement with said main lever, one of said triggers having a part adapted to be struck in the operation of said main lever to return said trigger to its normal locked position.

59. In a cash register, in combination with a casing, a cash drawer, means for locking the same in said casing, a platen, over which two record strips and a plurality of laterally spaced check strips together with transfer means are adapted to be fed, a cover plate provided with openings to expose said check strips and a part of each of said record strips, devices associated with each check strip for partially feeding the same, a spring controlled movable bar normally locking said check strip feeding devices against movement, means interposed between said check strip feeding device and said bar for moving said bar when it is released, a main and auxiliary trigger acting to lock said main operating lever, said main trigger having a tooth at one end and being capable of an initial and final movement, said triggers acting to lock said main operating lever until they have moved into unlocking position, the said main trigger locking said bar until said main trigger is initially moved, spring controlled depressible platen parts one associated with each record strip and one of said platen parts having a depending pawl normally engaged with the tooth on the main trigger, to lock said main trigger against initial movement until one of them is depressed, said bar when moved by said check strip feeding device acting to produce the final movement of said main trigger in its release of the main operating lever, and means actuating the auxiliary trigger to move it out of locking engagement with said main lever, the main trigger having a part adapted to be struck in the operation of said main lever to return said trigger toward its locked position until its locking tooth engages with the depending pawl of said depressible platen part.

60. In a cash register, in combination with a platen over which a record strip and a plurality of laterally spaced superposed check strips together with transfer means are adapted to be fed, a cover plate provided with openings to expose said check strips and a part of said record strips, a slide attached to said cover plate and movable thereon associated with each check strip, means for feeding said check strip operated by said slide, a spring controlled longitudinally movable bar normally locking said slides against movement, means intermediate each of said slides and said bar for moving said bar when it is released, a main operating lever, a main and auxiliary trigger acting to lock said main operating lever, said main trigger being capable of an initial and final movement, said triggers acting to lock said main operating lever until they have been moved into unlocking position, said main trigger locking said bar until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said main trigger, and means for producing final movement of said auxiliary trigger.

61. In a cash register, in combination with a platen over which a record strip and a plurality of laterally spaced superposed check strips together with transfer means are adapted to be fed, a cover plate provided with openings to expose said check strips and a part of said record strip, a slide attached to said cover plate and movable thereon, associated with each check strip, means for feeding one of said check strips operated by an associated slide, a spring controlled longitudinally movable bar normally locking said slides against movement, means intermediate each of said slides and said bar for moving said bar when it is released, means preventing the feed of the other check strips after said bar has been moved, a main operating lever, a main and auxiliary trigger acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing final movement of said auxiliary trigger.

62. In a cash register, in combination with a platen over which a record strip and a plurality of laterally spaced superposed check strips together with transfer means are adapted to be fed, a cover plate provided with openings to expose said check strips and a part of said record strip, a slide attached to said cover plate and movable thereon associated with each check strip, means for feeding one of said check strips operated by an associated slide, a spring controlled longitudinally movable bar normally locking said slides against movement, means intermediate each of said slides and said bar for moving said bar when it is released, means for locking said bar after its movement has been accomplished, means carried by said bar for preventing the movement of the other of said check strip feeding slides, a main operating lever, a main and auxiliary trigger acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing final movement of said auxiliary trigger.

63. In a cash register, in combination with a platen over which two record strips and a plurality of laterally spaced superposed check strips together with transfer means are adapted to be fed, a cover plate provided with openings to expose said check strips and a part of said record strip, a slide attached to said cover plate and movable thereon associated with each check strip, means for feeding one of said check strips operated by said slide, a spring controlled longitudinally movable bar normally locking said slides against movement, means intermediate each of said slides and said bar for moving said bar when it is released, a main operating lever, a main and auxilary trigger acting to lock said main operating lever, said main trigger being capable of an initial and final movement, said triggers acting to lock said main operating lever until they have been moved into unlocking position, said main trigger locking said bar until said main trigger is initially moved, means intermediate said bar and main trigger for producing the final movement of said trigger after said trigger has accomplished its initial movement, spring controlled depressible platen parts included in said platen, there being one of said platen parts associated with each record strip, one of said platen parts acting to lock said main trigger against initial movement until either of said platen parts are depressed, means actuated upon depression of either of said platen parts for producing the initial movement of said trigger and means for producing final movement of said auxiliary trigger.

64. In a cash register, in combination with a platen over which two record strips and a plurality of laterally spaced superposed check strips together with transfer means are adapted to be fed, a cover plate provided with openings to expose said check strips and a part of said record strip, a slide attached to said cover plate and movable thereon, associated with each check strip, means for feeding one of said check strips operated by said slide, a spring controlled longitudinally movable bar normally locking said slides against movement, means intermediate each of said slides and said bar for moving said bar when it is released, means for locking said bar after its movement has been accomplished, means carried by said bar for preventing the movement of the other of said check-strip feeding slides, a main operating lever, a main and auxiliary trigger acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing final movement of said auxiliary trigger.

65. In a cash register, in combination with a platen over which a record strip and a plurality of laterally spaced check strips together with transfer means are adapted to be fed, a cover plate provided with openings to expose said check strips and a part of said record strip, a main operating lever, a main and auxiliary trigger acting to lock said main operating lever against movement, said triggers including movable heel parts which directly engage said lever, resilient members acting between said heel and main parts of said trigger adapted to produce an initial movement of said triggers, a spring controlled depressible platen part included in said platen having a pawl which normally engages with said main trigger to lock the same against initial movement, a member for actuating said main trigger to produce its final movement said member being locked by said main trigger against movement until the initial movement of said main trigger has been accomplished, and feeding devices associated with each check strip normally locked against movement by said main trigger actuating member and adapted to operate said main trigger actuating member when the same is released in its initial movement of said main trigger, and means for producing a final movement of said auxiliary trigger to release said main operating lever.

66. In a cash register, in combination with a platen over which a record strip and a plurality of laterally spaced check strips together with transfer means are adapted to be fed, a cover plate provided with openings to expose said check strips and a part of said record strip, a main operating lever, a main and auxiliary trigger acting to lock said main operating lever against movement, said triggers including movable heel parts which directly engage said lever, resilient members acting between said heel parts and main parts of said trigger adapted to produce an initial movement of said triggers, a spring controlled depressible platen part included in said platen having a pawl which normally engages with said main trigger to lock the same against initial movement, a member for actuating said main trigger to produce its final movement said member being locked by said main trigger against movement until the initial movement of said main trigger has been accomplished, and feeding devices associated with each check strip normally locked against movement by said main trigger actuating member and adapted to operate said main trigger actuating member when the same is released in its initial movement of said main trigger, means for producing a final movement of said auxiliary trigger to release said main operating lever, said main trigger having a part adapted to be struck in the operation of said lever to return both of said triggers to their normal positions.

67. In a cash register, in combination with a platen over which a record strip and a plurality of laterally spaced check strips together with transfer means are adapted to be fed, a cover plate provided with openings to expose said check strips and a part of said record strip, a main operating lever, a main and auxiliary trigger acting to lock said main operating lever against movement, said triggers including movable heel parts which directly engage said lever, resilient members acting between said heel and main parts of said triggers adapted to produce an initial movement of said triggers, a spring controlled depressible platen part included in said platen having a pawl which normally engages with said main trigger to lock the same against initial movement, a member for actuating said main trigger to produce its final movement, said member being locked by said main trigger against movement until the initial movement of said main trigger has been accomplished, and feeding devices associated with each check strip normally locked against movement by said main trigger actuating member and adapted to operate said main trigger actuating member when the same is released in its initial movement of said main trigger, and means for producing a final movement of said auxiliary trigger to release said main operating lever, said main trigger having a part adapted to be struck by said lever, in the forward movement thereof, to return both of said triggers to their normal position, said heel parts being adapted to be struck by said lever upon its return movement and to yield so that said lever may pass to its normally locked position.

68. In a cash register, in combination with a platen over which two record strips and a plurality of laterally spaced check strips together with transfer means are adapted to be fed, a cover plate provided with openings to expose said check strips and a part of each of said record strips, a main operating lever, a main and auxiliary trigger acting to lock said main operating lever against movement, said triggers including movable heel parts which directly engage said lever, resilient members acting between said heel parts and main parts of said trigger adapted to produce an initial movement of said triggers, interacting spring controlled depressible platen parts included in said platen, there being one of such depressible platen parts associated with each record strip one of said platen parts having a pawl which normally engages with said main trigger to lock the same against initial movement, a member for actuating said main trigger to produce its final movement, said member being locked by said main trigger against movement until the initial movement of said main trigger has been accomplished, and feeding devices associated with each check strip normally locked against movement by said main trigger actuating member and adapted to operate said main trigger actuating member when the same is released in its initial movement of said main trigger, and means for producing a final movement of said auxiliary trigger to release said main operating lever.

69. In a cash register, in combination with a platen over which two record strips and a plurality of laterally spaced check strips together with transfer means are adapted to be fed, a cover plate provided with openings to expose said check strips and a part of each of said record-strips, a main operating lever, a main and auxiliary trigger acting to lock said main operating lever against movement, said triggers including movable heel parts which directly engage said lever, resilient members acting between said heel parts and main parts of said trigger adapted to produce an initial movement of said triggers, interacting spring controlled depressible platen parts included in said platen, there being one of such depressible platen parts associated with each record strip, one of said platen parts having a pawl which normally engages with said main trigger to lock the same against initial movement, a member for actuating said main trigger to produce its final movement, said member being locked by said main trigger against movement until the initial movement of said main trigger has been accomplished, and feeding devices associated with each check strip normally locked against movement by said main trigger actuating member and adapted to operate said main trigger actuating member when the same is released by the initial movement of said main trigger, and means for producing a final movement of said auxiliary trigger to release said main operating lever, said main trigger having a part adapted to be struck in the operation of said lever to return both of said triggers to their normal position, said heel parts being adapted to be struck by said lever upon its return movement and to yield so that said lever may pass to its normally locked position.

70. In a cash register, in combination with a platen over which a record strip and a plurality of laterally spaced superposed check strips together with transfer means are adapted to be fed, a cover plate provided with openings to expose said check strips and a part of said record strip, a slide attached to said cover plate and movable thereon, associated with each check strip, means for feeding one of said check strips operated by an associated slide, a spring controlled longitudinally movable bar normally locking said slides against movement, means intermediate each of said slides and said bar for moving said bar when it is released, means for locking said bar after its movement has been accomplished, a main operating lever, a main and auxiliary trigger acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing final movement of said auxiliary trigger to release said main operating lever, said main trigger having a part adapted to be struck in the operation of said main lever to return said triggers to their normal position, said main trigger in its return movement unlocking said spring controlled longitudinally movable bar and permitting the same to return to its normal position.

71. In a cash register, in combination with a platen over which a record strip and a plurality of laterally spaced superposed check strips, together with transfer means are adapted to be fed, a cover plate provided with openings to expose said check strips and a part of said record-strip, a slide attached to said cover plate and movable thereon associated with each check strip, means for feeding one of said check strips operated by an associated slide, a spring controlled longitudinally movable bar normally locking said slides against movement, means intermediate each of said slides and said bar for moving said bar when it is released, means for locking said bar after its movement has been accomplished, means carried by said bar for preventing the movement of the other of said check strip feeding slides, a main operating lever, a main and auxiliary trigger acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing the final movement of said auxiliary trigger to release said main operating lever, said main trigger having a part adapted to be struck in the operation of said main lever to return said triggers to their normal position, said main trigger in its return movement unlocking said spring controlled longitudinally movable bar and permitting the same to return to its normal position.

72. In a cash register, in combination with a platen over which a record strip and a plurality of laterally spaced superposed check strips together with transfer means are adapted to be fed, a cover plate provided with openings to expose said check strips and a part of said record strip, a slide attached to said cover plate and movable thereon associated with each check strip, means for feeding one of said check strips operated by an associated slide, a spring controlled longitudinally movable bar normally locking said slides against movement, means intermediate each of said slides and said bar for moving said bar when it is released, means for locking said bar after its movement has been accomplished, means carried by said bar for preventing the movement of the other of said check strip feeding slides, a main operating lever, coaxially arranged main and auxiliary triggers acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing the final movement of said auxiliary trigger to release said main operating lever, said main trigger having a part adapted to be struck in the operation of said main lever to return said triggers to their normal position, said main trigger in its return movement unlocking said spring controlled longitudinally movable bar and permitting the same to return to its normal position.

73. In a cash register, in combination with a platen over which a record strip and a plurality of laterally spaced superposed check strips together with transfer means are adapted to be fed, a cover plate provided with openings to expose said check strips and a part of said record strip, a slide attached to said cover plate and movable thereon associated with each check strip, means for feeding one of said check strips operated by an associated slide, a spring controlled longitudinally movable bar normally locking said slide against movement, means intermediate each of said slides and said bar for moving said bar when it is released, means for locking said bar after its movement has been accomplished, said means comprising a pawl carried by said bar adapted for locking engagement with a fixed part of said cover plate, means carried by said bar for preventing the movement of the other of said check strip feeding slides, a main operating lever, coaxially arranged main and auxiliary triggers acting to lock said main operating lever, said main trigger being capable of an initial and final movement, said triggers acting to lock said main operating lever until they have been moved into unlocking position, said main trigger locking said bar against movement until said main trigger is initially moved, means intermediate said bar and main trigger for producing the final movement of said trigger after said trigger has accomplished its initial movement, a spring controlled depressible platen part included in said platen which acts to lock said main trigger against initial movement until depressed, means for producing the initial movement of said trigger and means for producing the final movement of said auxiliary trigger to release said main operating lever, said main trigger having a part adapted to be struck in the operation of said main lever to return said triggers to their normal position, said main trigger in its return movement engaging against said bar locking pawl to remove it from its locked position relative to a fixed part of said cover plate, to permit said bar to return to its normal position.

74. In a cash register, in combination with a platen over which a record strip and a plurality of laterally spaced check strips together with transfer means are adapted to be fed, feed rolls one for each check strip, a rock shaft against said feed rolls, a cover plate provided with openings which expose said check strips and a part of said record strip, main operating lever, a main and auxiliary trigger acting to lock said main operating lever against movement, said main trigger having an initial and final movement, a spring controlled depressible platen part included in said platen having a pawl which normally engages with said main trigger to lock the same against initial movement, a member for actuating said main trigger to produce its final movement, said member being locked by said main trigger against movement until the initial movement of said main trigger has been accomplished, and a feed slide associated with each check strip feed roll normally locked against movement by said main trigger actuating member and adapted to operate said main trigger actuating member when the same is released in its initial movement of said main trigger, said feed slide being adapted to actuate an associated feed roll after said main trigger actuating member has been unlocked, said feed roll in its operation imparting a rocking movement to said rock shaft, a second rock shaft, means operatively connecting said rock shafts, said second rock shaft being adapted to unlock said auxiliary trigger to release said main operating lever, means for producing a final movement of said auxiliary trigger to release said main operating lever, said main trigger having a part adapted to be struck in the operation of said lever to return both of said triggers to their normal position.

75. In a cash register, in combination with a platen over which a record strip and a plurality of laterally spaced check strips, together with transfer means, are adapted to be fed, feed rolls one for each check strip, a rock shaft against said feed rolls, a cover plate provided with openings to expose said check strips and a part of said record strip, a main operating lever, a main and auxiliary trigger acting to lock said main operating lever against movement, said main trigger having an initial and final movement, a spring controlled depressible platen part included in said platen having a pawl which normally engages with said main trigger to lock the same against initial movement, a member for actuating said main trigger to produce its final movement, said member being locked by said main trigger against movement until the initial movement of said main trigger has been accomplished, and a feed slide associated with each check strip feed roll normally locked against movement by said main trigger actuating member and adapted to operate said main trigger actuating member when the same is released in its initial movement of said main trigger, said feed slide being adapted to actuate an associated feed roll after said main trigger actuating member has been unlocked, said feed roll in its operation imparting a rocking movement to said rock shaft, a second rock shaft, means operatively connecting said rock shaft, said second rock shaft being adapted to unlock said auxiliary trigger to release said main operating lever, means for producing a final movement of said auxiliary trigger to release said main operating lever, said main trigger having a part adapted to be struck in the operation of said lever to return both of said triggers and the member imparting final movement to said main trigger to their normal position.

76. In a cash register, in combination with a platen over which a record strip and a plurality of laterally spaced check strips, together with transfer means are adapted to be fed, feed rolls one for each check strip, a cam lug on one end of said feed roll, a rock shaft adjacent said feed rolls, arms carried by said rock shaft, there being one arm associated with each feed roll lug, a cover plate provided with openings to expose said check strips and a part of said record strip, a main operating lever, a main and auxiliary trigger acting to lock said main operating lever against movement, said main trigger having an initial and final movement, a spring controlled depressible platen part included in said platen having a pawl which normally engages with said main trigger to lock the same against initial movement, a member for actuating said main trigger to produce its final movement, said member being locked by said main trigger against movement until the initial movement of said main trigger has been accomplished, and a feed slide associated with each check strip feed roll normally locked against movement by said main trigger actuating member and adapted to operate said main trigger actuating member when the same is released in its initial movement of said main trigger, said feed slide being adapted to actuate an associated feed roll after said main trigger actuating member has been unlocked, said feed roll lug and associated arm being adapted to impart a rocking movement to said rock shaft during the rotation of said feed roll, a second rock shaft, means operatively connecting said rock shafts, said second rock shaft being adapted to unlock said auxiliary trigger to release said main operating lever, said main trigger having a part adapted to be struck in the operation of said lever to return both of said triggers to their normal positions.

77. In a cash register, in combination with a platen over which a record strip and a plurality of laterally spaced check strips together with transfer means are adapted to be fed, feed rolls one for each check strip, a cam lug on one end of said feed roll, a rock shaft adjacent said feed rolls, arms carried by said rock shaft there being one arm associated with each feed roll lug, a cover plate provided with openings to expose said check strips and a part of said record strip, a main operating lever, a main and auxiliary trigger acting to lock said main operating lever against movement, said main trigger having an initial and final movement, a spring controlled depressible platen part included in said platen having a pawl which normally engages with said main trigger to lock the same against initial movement, a member for actuating said main trigger to produce its final movement, said member being locked by said main trigger against movement until the initial movement of said main trigger has been accomplished, and a feed slide associated with each check strip feed roll normally locked against movement by said main trigger actuating member and adapted to operate said main trigger actuating member when the same is released in its initial movement of said main trigger, said feed slide being adapted to actuate an associated feed roll after said main trigger actuating member has been unlocked, said feed roll lug and associated arm being adapted to impart a rocking movement to said rock shaft during the rotation of said feed roll, a second rock shaft, means operatively connecting said rock shaft, said second rock shaft being adapted to unlock said auxiliary trigger to release said main operating lever, said main trigger having parts adapted to be struck in the operation of said lever to return both of said triggers and the member imparting final movement to said main trigger to their normal positions.

78. In a cash register, a platen over which a record strip, transfer means and a check strip are adapted to be fed in a superposed relation, normally locked means for partially issuing said check strip, normally locked means for feeding said record strip, a depressible part included in said platen covered by said record strip, means operated by said depressible platen part for unlocking the check strip partial issuing means, and means actuated by the check strip during its final issuing movement for unlocking the record strip feeding means.

79. In a cash register, a platen over which a record strip, transfer means and a check strip are adapted to be fed in a superposed relation, normally locked means for partially issuing said check strip, a normally locked lever for feeding said record strip and transfer means, a depressible part included in said platen covered by said record strip, means operated by said depressible platen part for unlocking the check strip partial-issuing-means, and means actuated by the check strip during its final issuing movement for unlocking the normally locked lever for feeding the record strip and transfer means.

80. In a cash register, in combination with a casing, a normally locked cash drawer in said casing, a platen over which a record strip, transfer means and a check strip are adapted to be fed, a portion of said check strip and record strip being exposed, normally locked means for partially feeding the check strip, normally locked means for releasing said cash drawer, a depressible platen part included in said platen, said depressible platen part being covered by the exposed portion of said record strip, means operated by said depressible platen part for unlocking the check strip partial feeding means and means actuated by the check strip during its complete withdrawal for unlocking the cash drawer releasing means.

81. In a cash register, a platen over which a record strip, transfer means and a check strip are adapted to be fed in a superposed relation, a portion of said record strip and check strip being exposed, normally locked means for partially feeding the check strip, normally locked means for feeding said transfer means and record strip, a depressible part included in said platen below the exposed portion if said record strip, means operated by said depressible platen part for unlocking the check strip feeding means, and means actuated by the check strip upon complete withdrawal for unlocking said record strip and transfer feeding means.

82. In a cash register, in combination with a cash drawer and means for normally locking the same in a closed position, a platen over which a record strip, a transfer strip and a check strip are adapted to be fed in superposed order so that a portion of said check strip and record strip are exposed, a device for imparting a partial issue to said check strip, a slide bar normally locking said check strip feeding device against movement, a lever for unlocking said cash drawer and for feeding the record strip and transfer strip, a depressible part included in the platen located beneath the exposed portion of the record strip, a main trigger normally locked by the depressible platen part and preventing movement of said slide bar, and auxiliary trigger adapted to normally extend into the path of and prevent movement of the said lever and means operable by said check strip during its final issue movement for releasing said auxiliary trigger, said auxiliary trigger moving out of the path of said lever.

83. In a cash register, in combination with a cash drawer and means for normally locking the same in a closed position, a platen over which a record strip, a transfer strip and a check strip are adapted to be fed in superposed order so that a portion of said check strip and record strip are exposed, a device for imparting a partial issue to said check strip, a slide bar normally locking said check strip feeding device against movement, a lever for unlocking said cash drawer and for feeding the record strip and transfer strip, a depressible part included in the platen located beneath the exposed portion of the record strip, a main trigger normally locked by said depressible platen part and preventing movement of said slide bar, an auxiliary trigger, said main and auxiliary triggers including yielding parts which normally stand in the path of said lever and prevent movement of said lever, means operable by said check strip when it is withdrawn a full check length, for releasing the said auxiliary trigger, the yielding part of said auxiliary trigger moving out of the path of said lever, and means for resetting the yielding parts of said triggers.

84. In a cash register, in combination with a cash drawer and means for normally locking the same in a closed position, a platen over which a record strip, a transfer strip and a check strip are adapted to be fed in superposed order so that a portion of said check strip and record strip are exposed, a device for imparting a partial issue to said check strip, a slide bar normally locking said check strip feeding device against movement, a lever for unlocking said cash drawer and for feeding the record strip and transfer strip, a depressible part included in the platen located beneath the exposed portion of the record strip, a main trigger normally locked by said depressible platen part and preventing movement of said slide bar, an auxiliary trigger, said main and auxiliary triggers including yielding parts which normally stand in the path of said lever and prevent movement of said lever, means operable by said check strip when it is withdrawn a full check length, for releasing the said auxiliary trigger, the yielding part of said auxilary trigger moving out of the path of said lever, and means actuated by the lever in its operating movement for resetting said yielding parts of the triggers into the path of said lever, said parts yielding in the return movement of said lever, to permit said lever to pass said yielding parts.

85. In a cash register, a platen over which a record strip, a transfer strip and a check strip are adapted to be fed in superposed relation, a portion of said check strip and record strip being exposed in the plane of said platen, a device for partially feeding the check strip, a slide normally locking said check strip feeding device against movement, a lever for feeding the record and transfer strip, a depressible part included in said platen and covered by the exposed portion of the record strip, a main trigger normally locked by said depressible platen part, said trigger preventing movement of said slide and lever until released from said depressible platen part, an auxiliary trigger adapted to prevent operation of said lever after the main trigger has been operated to release said lever, and means operated by said check strip when it is withdrawn a full check length for permitting said auxiliary trigger to move out of locking engagement with said lever.

86. In a cash register, a platen over which a record strip, a transfer strip and a check strip are adapted to be fed in superposed relation, a portion of said check strip and record strip being exposed in the plane of said platen, a device for partially feeding the check strip, a slide normally locking said check strip feeding device against movement, a lever for feeding the record and transfer strip, a depressible part included in said platen and covered by the exposed portion of the record strip, a main trigger normally locked by said depressible platen part, said trigger preventing movement of said slide and lever until released from said depressible platen part, an auxiliary trigger adapted to prevent operation of said lever after the main trigger has been operated to release said lever, means operated by said check strip when it is withdrawn a full check length for permitting said auxiliary trigger to move out of engagement with said lever and means for returning said triggers to a reset position.

87. In a rash register, a platen over which a record strip, a transfer strip and a check strip are adapted to be fed in superposed relation, a portion of said check strip and record strip being exposed in the plane of said platen, a device for partially feeding the check strip, a slide normally locking said check strip feeding device against movement, a lever for feeding the record and transfer strip, a depressible part included in said platen and covered by the exposed portion of the record strip, a main trigger normally locked by said depressible platen part, said trigger preventing movement of said slide and lever until released from said depressible platen part, an auxiliary trigger adapted to prevent operation of said lever after the main trigger has been operated to release said lever, means operated by said check strip when it is withdrawn a full check length for permitting said auxiliary trigger to move out of engagement with said lever and means actuated by said lever in its movement to operate said record strip and transfer strip feeding means for returning said triggers to a reset position.

88. In a cash register, a platen over which a record strip, a transfer strip and a check strip are adapted to be fed in a superposed relation, a portion of said check strip and record strip being exposed in the plane of the platen, a device for partially feeding the check strip, a slide normally locking said check strip feeding device against movement, a lever for feeding the record strip and transfer strip, a depressible part included in said platen and covered by the exposed portion of said record strip, a main trigger normally locked by said depressible platen part, said trigger preventing movement of said slide and lever until released from said depressible platen part, an auxiliary trigger adapted to prevent operation of said lever after said main trigger has been operated to release said lever and slide, said slide being moved during the preliminary feed of the check strip, means for locking said slide after having been thus moved, means actuated by the said check strip when it is withdrawn a full check length for permitting said auxiliary trigger to move out of locking engagement with said lever, and means actuated by said lever in its movement to operate said record strip and transfer strip, to release said slide and to lock said main trigger relative to said depressible platen part and said triggers including parts which yield to permit said lever to be returned to its normally locked position.

89. In a cash register, a platen over which a record strip, a transfer strip and a check strip are adapted to be fed in a superposed relation, a portion of said check strip and said record strip being exposed in the plane of said platen, a device for partially feeding the check strip, a slide bar normally locking said check strip feeding device against movement, a lever for feeding the record strip, a depressible lever plate in the plane of the platen and below the exposed part of the record strip, a main trigger normally locked by said depressible lever plate, said trigger preventing movement of said slide and lever until released by said depressible lever plate, an auxiliary trigger adapted to prevent operation of said lever, means actuated by the check strip when it is withdrawn a full check length for releasing said auxiliary trigger, and means for automatically locking said slide bar to prevent further operation of said check strip partial feeding means until after the lever has been operated.

90. In a cash register, a platen over which a record strip, a transfer strip and a check strip are adapted to be fed in a superposed relation, a portion of said check strip and record strip being exposed in the plane of said platen, a device for partially feeding the check strip, a slide bar normally locking said check strip feeding device against movement, a lever for feeding the record strip, a depressible lever plate in the plane of the platen, and below the exposed part of the record strip, a main trigger normally locked by said depressible lever plate, said trigger preventing movement of said slide and lever until released by said depressible lever plate, an auxiliary trigger adapted to prevent operation of said lever, means actuated by the check strip, when it is withdrawn a full check length for releasing said auxiliary trigger, and means for automatically locking said slide bar to prevent a second operation of said check strip partial feeding means, until after said lever has been operated to impart a feeding movement to said record strip, said lever in said movement unlocking said bar.

91. In a cash register, a platen over which a record strip, a transfer strip and a check strip are adapted to be fed in a superposed relation, a portion of said check strip and record strip being exposed in the plane of said platen, a device for partially feeding the check strip, a slide bar normally locking said check strip feeding device against movement, a lever for feeding the record strip, a depressible lever plate in the plane of the platen, and below the exposed part of the record strip, a main trigger normally locked by said depressible lever plate, said trigger preventing movement of said slide and lever until released by said depressible lever plate, an auxiliary trigger adapted to prevent operation of said lever, means actuated by the check strip, when it is withdrawn a full check length for releasing said auxiliary trigger, and means for automatically locking said slide bar to prevent a second operation of said check strip partial-feeding-means, until after said lever has been operated to impart a feeding movement to said record strip, said lever in said movement unlocking said bar, and returning said main trigger to a locking engagement with said depressible lever plate and to a position together with the auxiliary trigger for locking engagement with said lever after said lever has been returned to its normal position.

92. In a cash register, a platen over which a record strip, a transfer strip and a check strip are adapted to be fed in superposed order, said record strip and check strip having portions which are exposed, a device for partially feeding the check strip, a slide normally locking said check strip feeding device against movement, a lever for feeding the record strip and transfer strip simultaneously, a depressible part included in said platen located below the exposed portion of the record strip, a pawl normally locked by said depressible platen part adapted to prevent movement of said slide and lever, a second pawl associated with said first mentioned pawl adapted to prevent operation of said lever after it has been released by said first mentioned pawl, means operable by said check strip when it has been withdrawn a full check length for releasing said second mentioned pawl from locking engagement with said lever, and means for resetting said pawls to locking position during the feeding movement of said record strip and said transfer strip.

93. In a cash register, a platen over which a record strip, a transfer strip and a check strip are adapted to be fed in superposed order, said record strip and check strip having portions which are exposed, a device for partially feeding the check strip, a slide normally locking said check strip feeding device against movement, a lever for feeding the record strip and transfer strip simultaneously, a depressible part included in said platen located below the exposed portion of the record strip, a pawl normally locked by said depressible platen part adapted to prevent movement of said slide and lever, a second pawl associated with said first mentioned pawl, adapted to prevent operation of said lever after it has been released by said first mentioned pawl, means operable by said check strip when it has been withdrawn a full check length for releasing said second mentioned pawl from locking engagement with said lever, said lever in its operation imparting a feeding movement to said record strip, and said transfer strip acting to reset said pawls to their normally locked positions.

94. In a cash register, a casing, a platen over which a record strip, transfer strip and a plurality of check strips are adapted to be fed, said record strip and all of said check strips having a portion exposed through said casing, devices for partially feeding the several check strips, a slide normally locking said devices against movement, a prime mover for feeding said record strip and said transfer strip, a depressible part included in the platen located below the exposed portion of the record strip, a pawl normally locked by said depressible platen part adapted to prevent the movement of the said slide a second pawl, associated with the first mentioned pawl normally preventing operation of said prime mover, and means operable by the check strip after a partial feed has been imparted to it for releasing said second pawl.

95. In a cash register, a casing, a platen over which a record strip, transfer strip and a plurality of check strips are adapted to be fed, said record strip and all of said check strips having a portion exposed through said casing, devices for partially feeding the several check strips, a slide normally locking said devices against movement, a prime mover for feeding said record strip and said transfer strip, a depressible part included in the platen located below the exposed portion of the record strip, a pawl normally locked by said depressible platen part adapted to prevent the movement of the said slide, a second pawl associated with the first mentioned pawl, normally preventing operation of said prime mover, means operable only by that check strip to which a partial feed has been imparted for releasing said second pawl, and means for resetting both of said pawls.

96. In a cash register, a casing, a platen over which a record strip, transfer strip and a plurality of check strips are adapted to be fed, said record strip and all of said check strips having a portion exposed through said casing, devices for partially feeding the several check strips, a slide normally locking said devices against movement, a prime mover for feeding said record strip and said transfer strip, a depressible part included in the platen located below the exposed portion of the record strip, a pawl normally locked by said depressible platen part adapted to prevent the movement of the said slide, a second pawl associated with the first mentioned pawl, normally preventing operation of said prime mover, means operable only by that check strip to which a partial feed has been imparted for releasing said second pawl, and means actuated by said prime mover in its movement to feed the said record strip and said transfer strip, for resetting said pawls.

97. In a cash register, a platen over which a plurality of record strips, transfer means and laterally spaced check strips are adapted to be fed, said check strips and record strips having exposed portions, normally locked means associated with each check strip for imparting a partial feeding movement thereto, normally locked means for feeding said record strips independently of each other for feeding said transfer strips, a depressible part included in the platen located below one of said record strips, means operated by said depressible platen part for unlocking said several check strip feeding means, and means actuated upon withdrawal of a full check length from any one of said check strips for feeding one of said record strips and said transfer means.

98. In a cash register, in combination with a casing having a top wall, with exposure openings therein, a platen over which a plurality of record strips, transfer strips and laterally spaced check strips are adapted to be fed, there being a record strip associated with one of said check strips, the other record strip being associated with the remainder of said check strips, said check strips and record strips having portions exposed through the openings in the top wall of the casing, means for imparting a partial feed to each of said check strips, a main operating lever, said lever being adapted for feeding said strips independently of each other and for feeding said transfer means, and means actuated by the partial feed of one of the check strips for operatively connecting the operating means of an associated record strip with said operating lever.

99. In a cash register, in combination with a casing having a top wall, with exposure openings therein, a platen over which a plurality of record strips, transfer strips and laterally spaced check strips are adapted to be fed, there being a record strip associated with one of said check strips, the other record strip being associated with the remainder of said check strips, said check strips and record strips having portions exposed through the openings in the top wall of the casing, means for imparting a partial feed to each of said check strips, a main operating lever adapted for feeding said record strips independently of each other and for feeding said transfer means, and means actuated by the partial feed of one of the check strips for operatively connecting the operating means of an associated record strip with the said operating lever, said lever in its operative movement imparting a movement to said record strip and transfer means without imparting a feeding movement to the other record strip.

100. In a cash register, a platen over which a plurality of check strips, transfer means and record strips are adapted to be fed, there being one check strip associated with one record strip and transfer means, the other check strip and transfer means being associated with the other record strip, normally locked means for partially issuing any of said check strips, a normally locked means for feeding either of said record strips and their associated transfer means, depressible platen parts included in said platen, there being one of such parts associated with each record strip, means operated by either of said depressible platen parts for unlocking the check strip partial-issuing-means of an associated check strip, and means actuated by the final issuing movement of said check strip for unlocking the feeding means of the associated record strip and transfer means.

101. In a cash register, in combination with a casing having a top wall provided with openings therein, a platen in said casing below said openings over which two record strips, a plurality of transfer means and laterally spaced check strips are adapted to be fed, a portion of each of said check strips and record strips being exposed through the openings in the top wall of the casing and one of said record strips being associated with one of said check strips and the other record strip being associated with the remainder of said check strips, normally locked means for feeding each of the check strips beyond its associated exposure openings, means for releasing said check strip feeding means, a main operating lever adapted for feeding either of said record strips independently of the other, and means operated by the check strip feeding means after it has been released from its locking means, for operatively connecting the feeding means of the associated record strip with said lever, the feeding means of the other record strip remaining inoperative during the movement of said lever.

102. In a cash register, in combination with a casing having a top wall provided with openings therein, a platen in said casing below said opening over which two record strips, a plurality of transfer means and laterally spaced check strips are adapted to be fed, a portion of each of said check strips and record strips being exposed through the openings in the top wall of the casing and one of said record strips being associated with one of said check strips and the other record strip being associated with the remainder of said check strips, normally locked means for feeding each of the check strips beyond its associated exposure opening, means for releasing said check strip feeding means, a main operating lever adapted for feeding either of said record strips independently of the other, and means operated by the check strip feeding means after it has been released from its locking means for operatively connecting the feeding means of the associated record strip with said lever.

103. In a cash register, in combination with a platen over which a plurality of record strips, transfer means and laterally spaced check strips are adapted to be fed, there being one record strip associated with one check strip and the other record strip being associated with the remainder of said check strips, means for feeding any one of said check strips, a main operating lever, said lever being capable of imparting a feeding movement to either of said record strips, and means actuated by said check strip feeding means for operatively connecting the feeding means of its associated record strip to said lever.

104. In a cash register, in combination with a platen over which a plurality of record strips, transfer means and laterally spaced check strips are adapted to be fed, there being one record strip associated with one check strip and the other record strip being associated with the remainder of said check strips, means for feeding any one of said check strips, rolls, one associated with and upon which each record strip is wound, a main operating lever, mechanism associated with each roll, and means actuated by the feeding means of any of said check strips for operatively connecting the mechanism of its associated record strip roll with said lever.

105. In a cash register, in combination with a platen over which a plurality of record strips, transfer means and laterally spaced check strips are adapted to be fed, there being one record strip associated with one check strip and the other record strip being associated with the remainder of said check strips, means for feeding any one of said check strip rolls, one associated with and upon which each record strip is wound, a main operating lever, a mechanism associated with each roll, means actuated by the feeding means of any of said check strips for operatively connecting the mechanism of its associated record strip roll with said lever, and a device connecting said mechanism which prevents the operation of one of said mechanisms when the other is operatively connected to the lever.

106. In a cash register, in combination with a platen over which two record strips, transfer strips and laterally spaced check strips are adapted to be fed, there being one record strip associated with one check strip, the other record strip being associated with the remainder of said check strips, means for feeding any one of said check strips, a main operating lever, said operating lever being capable of imparting a feeding movement to either of said record strips, means actuated by the check strip feeding means for operatively connecting the feeding means of its associated record strip to the lever, and means actuated upon the return movement of said lever for returning the feeding means of both of said record strips to their normal positions.

107. In a cash register, means for issuing a check strip in uniform lengths, including in combination with a check strip having a plurality of equally spaced, longitudinally arranged perforations, a roller provided with a plurality of radially disposed pins or teeth on its periphery, spaced at arcuate distances equal to the longitudinal perforations of said check strip, means for imparting a rotative movement to said roller to partially feed said check strip, and a device to automatically stop the rotative movement of said roller when actuated by said check strip in its further withdrawal, when a predetermined part of its complete rotative movement has been accomplished.

108. In a cash register, means for issuing a check strip in uniform lengths, including in combination with a check strip having a plurality of equally spaced, longitudinally arranged perforations, a roller having a peripheral length equal to that of a length of a check, said roller having a plurality of radially disposed pins or teeth on its periphery spaced at arcuate distances equal to the longitudinal perforations of said check strip, means for imparting an initial rotative movement to said roller to partially feed said check strip, and a device acting to automatically stop said roller when actuated by said check strip in its further withdrawal, when said roller has made a complete revolution.

In testimony, that we, claim the foregoing as our invention we affix our signatures in the presence of two witnesses, this 6th day of August A. D. 1915.

JOSHUA L. MORRIS.
ALBERT W. LARIMORE.

Witnesses:
T. H. ALFREDS,
KARL W. DOLL.